United States Patent [19]
Sawada et al.

[11] Patent Number: 6,030,056
[45] Date of Patent: Feb. 29, 2000

[54] ON-VEHICLE BRAKE SYSTEM

[75] Inventors: Mamoru Sawada, Yokkaichi; Takahiro Kiso, Kariya; Kazutoshi Yogo, Aichi-gun, all of Japan

[73] Assignee: Denso Corporation, Kariya, Japan

[21] Appl. No.: 08/907,894

[22] Filed: Aug. 11, 1997

[30] Foreign Application Priority Data

| Aug. 9, 1996 | [JP] | Japan | 8-210763 |
| Jun. 24, 1997 | [JP] | Japan | 9-166940 |
| Aug. 4, 1997 | [JP] | Japan | 9-208938 |

[51] Int. Cl.[7] ............... B60T 8/34; B60T 8/36
[52] U.S. Cl. ............... 303/113.5; 303/119.1
[58] Field of Search .......... 303/186, 187, 303/188, 189, 192, 155, 113.5, 116.1, 119.1

[56] References Cited

U.S. PATENT DOCUMENTS

| 4,630,706 | 12/1986 | Takayama et al. | 180/273 |
| 4,824,183 | 4/1989 | Uchida et al. | 303/92 |
| 4,852,950 | 8/1989 | Murakami | 303/100 |
| 5,271,667 | 12/1993 | Takata et al. | 303/113.2 |
| 5,302,007 | 4/1994 | Morita et al. | 303/9.73 |

FOREIGN PATENT DOCUMENTS

| 4-005155 | 1/1992 | Japan . |
| 4-230461 | 8/1992 | Japan . |
| 8-058555 | 3/1996 | Japan . |

Primary Examiner—Christopher P. Schwartz
Assistant Examiner—Jeffrey Woller
Attorney, Agent, or Firm—Pillsbury Madison and Sutro LLP

[57] ABSTRACT

During a time period of from a time that is immediately before a vehicle being stopped to a time of the vehicle being stopped, a pressure increase gradient in braking fluid pressure which is applied to wheel cylinders of rear wheels is made to be larger than a pressure increase gradient that prevailed until a time that was immediately before the vehicle being stopped. As a result, a pitching motion that occurs in a vehicle body can be suppressed.

22 Claims, 6 Drawing Sheets

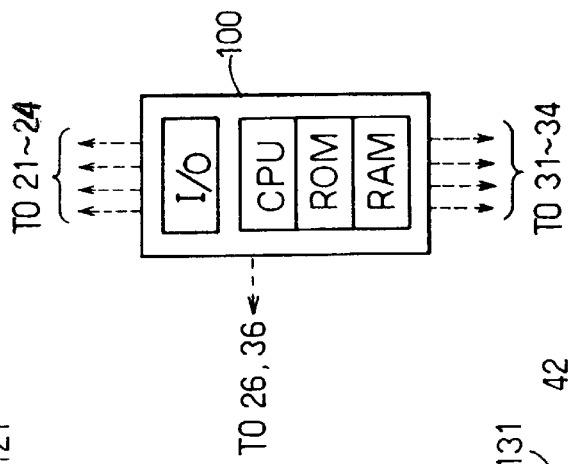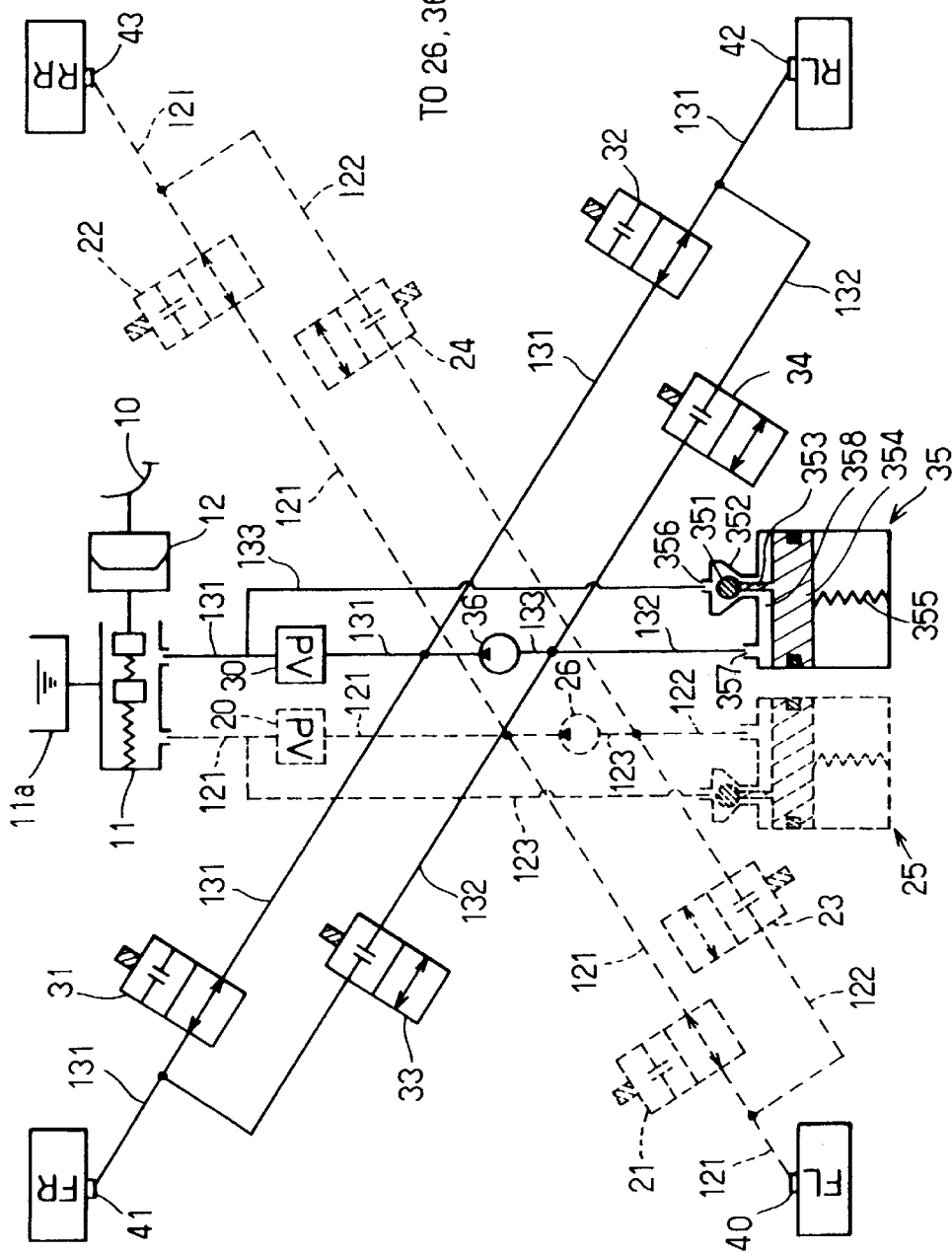

ON-VEHICLE BRAKE SYSTEM

CROSS REFERENCE TO RELATED APPLICATION

This application is based upon and claims priority from Japanese Patent Applications No. Hei. 8-210763 filed Aug. 9, 1997, and No Hei. 9-166940 filed Jun. 24, 1997, the contents of which are incorporated herein by reference.

BACKGROUND OF THE INVENTION

1. Field of The Invention

The present invention relates to a brake system for a vehicle and, more particularly, to an on-vehicle brake system which is capable of suppressing a pitching motion that occurs in the vehicle body at a time of the vehicle being braked.

2. Related Arts

When a braking force acts on a vehicle, the shift of a load occurs on the vehicle body in correspondence with the deceleration that occurs in the vehicle body. With the occurrence of this shift of the load, there occurs a pitching motion of a forward portion of the vehicle body being sunk or moved down and a rearward portion thereof being floated or moved up. In correspondence with this pitching motion, the upper half of a crew's body is brought to a state of its being more forwardly urged. That is, owing to the deceleration of the vehicle body, the forward urging force acts on the upper half of the crew's body and, in addition, the occurrence of the pitching motion tends to forwardly move the crew's body additionally to this forward urging force. Accordingly, at a time of the vehicle being braked, it is ordinarily required for the crew to try to remain unmoved with a considerably high magnitude of force so as for him to overcome the forwardly acting force. Further, since the pitching motion occurs most largely at around a time that is immediately before the vehicle being stopped due to the expansion and contraction of the suspensions of the vehicle, especially in a case of the vehicle being attempted to be suddenly stopped, it results that the crew becomes forwardly urged unless he exerts his considerably high magnitude of force. It is to be noted that when the brake pedal has been rapidly depressed, namely when a braking force that is greater than a prescribed value has been applied to the vehicle body, also, a large load shift occurs with the result that there occurs the pitching motion of the front side of the vehicle body being sunk and of the rear side thereof being floated.

Also, although the load is being shifted to the front side of the vehicle body until a time that is immediately before the vehicle body being stopped, especially at around a time that is immediately after the vehicle being stopped the load is shifted reversely toward the rear side of the vehicle body so as for the vehicle body to be back to its ordinary state. Therefore, at a time that is immediately after the vehicle body being stopped, as the load is shifted toward the rear side of the vehicle body, the suspensions expand or contract in a direction that is opposite to that at a time that is immediately before the vehicle being stopped, with the result that there occurs a swing-back motion of the vehicle body being swung back. In accordance with this swing-back motion of the vehicle body, a force that acts in a direction that is opposite to the direction of the force which at a time of the braking being effected is acted in the forward direction, namely, in a direction that is toward the rear side of the vehicle body, acts on the upper part of the crew's body.

In this way, by the motion of the vehicle body that is attributable to the deceleration that occurs in the vehicle body when the vehicle is braked, the force that became a burden upon the crew acted on the crew.

SUMMARY OF THE INVENTION

Accordingly, the object of the present invention is to provide an on-vehicle brake system which, by adjusting the braking action upon the respective vehicle wheels and thereby controlling the reaction forces that the respective vehicle wheels receive from the road surface and thereby aptly controlling especially the motion of the vehicle body that occurs when a body braking force that is greater than a prescribed value has been applied to the vehicle and the motion of the vehicle body that occurs at around a time of, or before and after, the vehicle being stopped, suppresses the pitching motion, thereby being improved in the feeling at a time of the vehicle body being braked.

In order to attain the above object, in an on-vehicle brake system according to the present invention, there is provided a control device which, by making the pressure increase gradient in braking fluid pressure which during a vehicle braking time period of from a time that is immediately before the vehicle being stopped to a time of the vehicle being stopped is applied to a vehicle wheel braking force generating device for causing the vehicle wheel braking force to be generated in the vehicle wheels of the rear wheels side, greater than the pressure increase gradient that prevails until a time that is immediately before the vehicle being stopped, suppresses the occurrence of the pitching motion in the vehicle body.

By this control device being provided, the braking fluid pressure which at a time that is immediately before the vehicle being stopped is applied to the vehicle wheel braking force generating device of the rear wheels side is rapidly increased. As a result, road surface reaction force that is received by the vehicle wheels of the rear wheels side from the road surface is rapidly increased compared to that which is received thereby before the control device being actuated. The road surface reaction force is caused by braking the rear wheels, that is, decelerating the rear wheels. This road surface reaction force acts on the vehicle body through the rear wheels so as to cause the rearward portion of the vehicle to move down toward the road surface.

Therefore, by the road surface reaction force that is received by the rear wheels being increased immediately before the vehicle being stopped in this way, there occurs the drawing motion of the vehicle being drawn toward the road surface on its rear side, with this increase in the road surface reaction force. Thus, there is suppressed the pitching motion that occurs in the vehicle body. Also, in accompaniment with the pitching motion suppressed, the swing-back motion that occurs after the vehicle being stopped also is decreased.

It is to be noted that by the road surface reaction force that is received by the rear wheels being increased immediately before the vehicle being stopped it is also possible to shorten the distance over which the vehicle is braked to its stop.

Also, it can be arranged that there is provided the control device for suppressing the occurrence of a pitching motion in a vehicle body by applying a second braking fluid pressure, that is higher than a first braking fluid pressure which is generated in correspondence with the depressing operation of a brake pedal by a crew, to the vehicle wheels of a rear wheels side during a time period of from a time that is immediately before the vehicle being stopped to a time of the vehicle being stopped. As a result, the rear wheels of the rear wheels side can receive the road surface reaction force that is increased by the second braking fluid pressure at a time that is immediately before the vehicle being stopped. That is to say, the road surface reaction force that is greater than the road surface reaction force that is received until a time that is immediately before the vehicle being stopped can be exhibited in the rear wheels. Therefore, there is realized the suppression of the pitching motion and the swing-back motion. Note that the second braking fluid pressure is preferably set so that the slipping degrees of the rear wheels do not exceed a predetermined value.

Further, the occurrence of a pitching motion in a vehicle body may be suppressed by, after the vehicle having been brought to a state of its traveling at a speed lower than a prescribed speed at a time that is immediately before the vehicle being stopped, making the braking fluid pressure that is applied to the vehicle wheel braking force generating devices for the rear wheels higher than the braking fluid pressure that was applied to the vehicle wheel braking force generating devices for the rear wheels before there being reached the state of the vehicle traveling at the speed lower than the prescribed speed.

Since, by even this structure, there is increased the braking fluid pressure for being applied to the vehicle wheel braking force generating devices of the rear wheels side, the pitching motion can be suppressed.

Also, in the on-vehicle brake system equipped with a so-called diagonal piping, the control device may cause an increase in the braking fluid pressure that is applied to the rear wheels side at a time immediately before the vehicle being stopped by moving the braking fluid from the vehicle wheel braking force generating devices of the front wheels side to the braking force generating devices of the rear wheels side, to suppress the occurrence of the pitching motion. In other words, the control device reduces the brake fluid pressure applied to the vehicle wheel braking force generating devices of the front wheels side and increases the brake fluid pressure applied to the braking force generating devices of the rear wheels side by using the brake fluid discharged from the vehicle wheel braking force generating devices of the front wheels side.

At this time, the total amount of the braking fluid in the respective piping systems is unchanged. Therefore, the total sum of the vehicle wheel braking forces of the front wheels side and rear wheels side in the respective piping systems is also unchanged between after and before the control device being actuated. For this reason, the suppression of the pitching motion can be realized with the vehicle wheel braking force being only moved from the front wheels side to the rear wheels side and with no braking force of the vehicle body being decreased.

It is to be noted that first and second pressure amplifying devices in each system of the diagonal piping and the braking fluid pressure adjusting device may be provided. In this arrangement, if, at a time of the vehicle having been brought to a state of traveling at a speed that is lower than a prescribed speed, the control device causes the braking fluid pressure adjusting device to adjust the braking fluid pressure, the braking fluid pressure in the vehicle wheel braking force generating devices of the front wheels side is adjusted in the on-vehicle brake system in which the front wheels are ordinarily precedingly locked than the rear wheels. Therefore, the braking fluid pressure that has been increased by one of the first and second pressure amplifying devices is applied to the vehicle wheel braking force generating devices of the rear wheels side and, in addition, in the vehicle wheel braking force generating devices of the front wheels side, there is realized the control of the braking fluid pressure by the braking fluid pressure adjusting device which can perform pressure-reducing control, pressure-maintaining control and pulse pressure-increasing control.

Also, the control device may limit, during a time period of from a time that is immediately before the vehicle being stopped to a time of the vehicle being stopped, the increase in the braking fluid pressure that is applied to the vehicle wheel braking force generating devices for generating the vehicle wheel braking force of the front wheels side.

At this time, the road surface reaction force that is received by the front wheels at a time that is immediately before the vehicle being stopped is more decreased than the road surface reaction force that was received by the front wheels from the road surface in a stage that preceded the time that was immediately before the vehicle being stopped. Accordingly, when the control device has been actuated, since the deceleration that has occurred in the vehicle body due to the front wheels is reduced, there is mitigated the shift of the load to the front side of the vehicle body. In this way, by reducing the road surface reaction force received by the front wheels from the road surface, in addition to there being increased the road surface reaction force that is received by the rear wheels therefrom, there is exhibited the motion of the rear side of the vehicle body being drawn toward the road surface. As a result, the shift of the load of the vehicle body that is attributable to the vehicle wheels of the front wheels side is mitigated, whereby the pitching motion of the vehicle body can be further suppressed and the swing-back motion that occurs after the vehicle body being stopped can be also further suppressed. In addition, since the decrease in the deceleration of the vehicle body that has been caused to occur due to the front wheels can be compensated for by the rear wheels, it is possible to prevent a feeling of lack of deceleration G from being imparted to the crew in the motion of the vehicle body as a whole.

Also, it may be also arranged that the first and second pressure amplifying devices that are disposed in the respective piping systems comprise a first maintaining device and a first moving device and a second maintaining device and a second moving device, respectively. If the first and second pressure amplifying device are actuated at a time that is immediately before the vehicle being stopped, since the braking fluid is moved from the side of the braking fluid pressure generating device to the wheel braking force generating devices for the front and rear wheels by the first and second moving devices, there is decreased the braking fluid pressure that has been generated in the braking fluid pressure generating device. Accordingly, in a case where the force causing the generation of the braking fluid pressure in the braking fluid pressure generating device is generated by the operation of the brake pedal performed by the crew, there can be decreased the operating force that is needed for the operation of the brake pedal, with the result that the draw-in action of the brake pedal can be exhibited. Also, since with an increase in the pedal stroke that occurs as a result of this pedal draw-in action there is increased the braking fluid pressure with respect to the respective vehicle wheel braking force generating devices, which is maintained by the first and second maintaining devices, there is also increased the braking force that is applied to the vehicle. In this way, there can be realized the braked state of the vehicle that corresponds to the assisted step-in operation of the brake pedal by the crew, whereby the crew's feeling of braking can be improved.

Also, if each of the first and second maintaining devices is composed of a proportioning control valve, the first and second maintaining devices reduce braking fluid pressure in the wheel braking force generating devices in correspondence with the braking fluid pressure that prevails on the side of the braking fluid pressure generating device. Therefore, by adjusting only the braking fluid pressure in the braking fluid pressure generating device, it is possible to adjust the braking fluid pressure that is applied to the vehicle wheel braking force generating devices. When, for example, there is being generated the braking fluid pressure in the braking fluid pressure generating device by the brake pedal being operated, it results that the braking fluid pressure that has been increased in correspondence with the crew's operation of the brake pedal is applied to the respective vehicle wheel braking force generating devices.

Also, if braking fluid that has been accumulated in a reservoir is pumped up and caused to flow to the side of the respective vehicle wheel braking force generating devices, the braking fluid pressure that is applied to the vehicle wheel braking force generating devices of the rear wheels side can be increased with an excellent responsiveness at a time that is immediately before the vehicle being stopped.

It is to be noted that the state where the pitching motion of the vehicle body occurs can be determined by the use of the respective following methods. That is, since the pitching motion in the vehicle body occurs even when the braking force is applied to the vehicle with a rapid braking operation, such a rapid braking operation may be determined by the use of the rate of change in the stroke of the brake pedal, the level of the master cylinder pressure, the rate of change in the master cylinder pressure, the magnitude of the deceleration of the vehicle body, etc.

Also, the braking fluid pressure in the wheel braking force generating devices may be controlled in relation to an ideal braking force distribution between the front and rear wheels. In this case, if there is executed the pressure amplifying type of control in which the pressure that is higher than the master cylinder pressure is generated in the brake system and applied to the vehicle wheel braking force generating devices which are wheel cylinders, the braking efficiency becomes the highest and, in addition, the braking distance is also shortened. Further, if the braking fluid pressure is applied to the vehicle wheel braking force generating devices of the respective wheels so that the braking force distribution between the front and rear wheels is approximate to that which corresponds to the ideal braking force distribution, the largest vehicle wheel braking force can be exhibited on each of the front and rear wheels. Therefore, the sink-down of the vehicle body both on the front side and on the rear side thereof is averaged with the result that the motion of the vehicle body as a whole is sunken down. Therefore, the motion of the vehicle body is not of a type of motion (pitching motion) wherein the vehicle body is largely sunk down on its front wheels side and floated on its rear wheels side but of a type of motion wherein the vehicle body as a whole is sunk down. As a result, there can be improved the crew's riding quality on the vehicle.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIGS. 1A and 1B are schematic diagrams illustrating the construction according to a first embodiment;

DETAILED DESCRIPTION OF THE PREFERRED EMBODIMENTS

Figure 2:
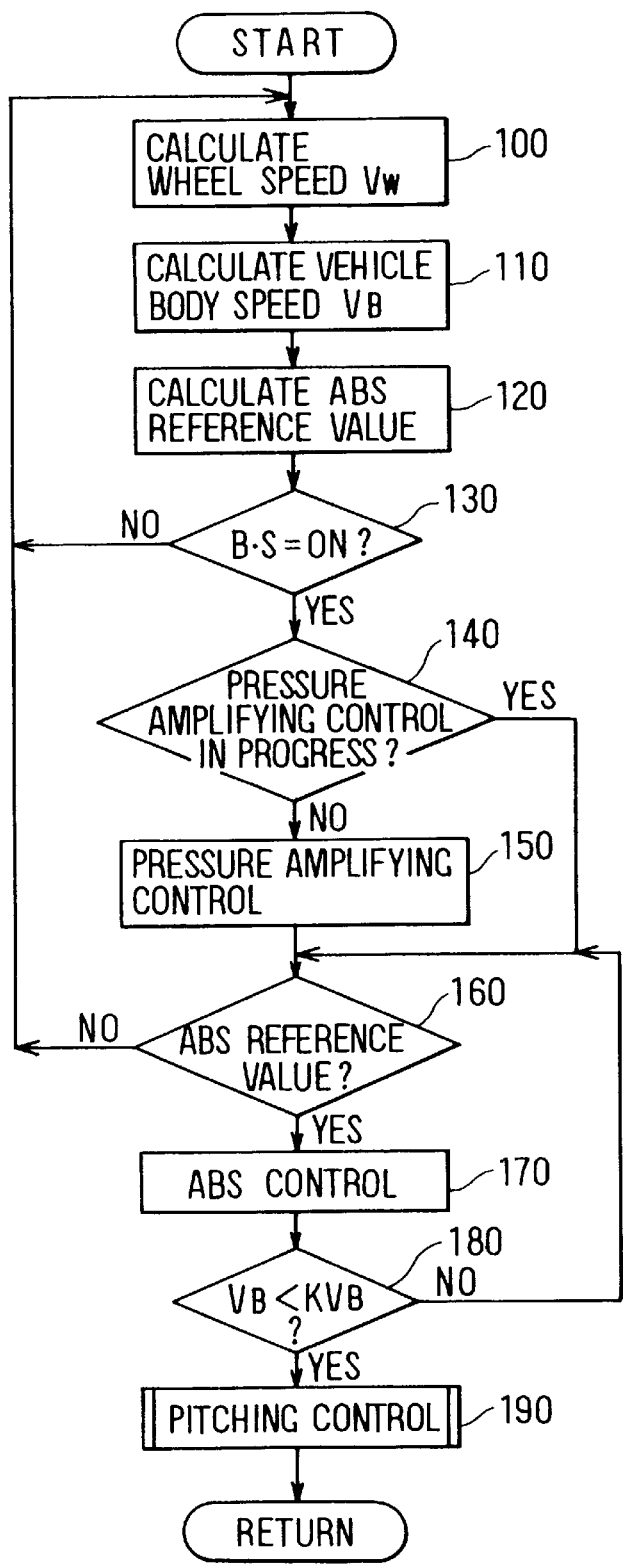
FIG. 2 is a flow chart illustrating a control flow in the first embodiment.

An on-vehicle brake system to which the present invention has been applied will now be explained with reference to the drawings.

FIGS. 1A and 1B illustrate an example wherein the present invention has been applied to an on-vehicle brake system that has been constructed by means of a diagonal piping that has piping systems for use in a front/right wheel FR-rear/left wheel RL and a front/left wheel FL-rear/right wheel RR.

When a brake pedal 10 that is to be operated by a crew at a time of a vehicle being braked is stepped in, a brake booster 12 for boosting the step-in force of the crew or the pedal stroke of the brake pedal 10 starts to perform its boosting action. By receiving the brake pedal operation that has been boosted by this brake booster 12, a master cylinder pressure PM is generated in a master cylinder 11. It is to be noted that a master reservoir 11a is disposed with respect to this master cylinder 11.

A first piping system is formed from the master cylinder 11 to a first wheel cylinder 41 and a second wheel cylinder 42 that have respectively been provided on the front/right wheel FR and the rear/left wheel RL. Also, similarly, a second piping system is formed from the master cylinder 11 to a third wheel cylinder 40 and a fourth wheel cylinder 43 that have been provided on the front/left wheel FL and the rear/right wheel RR. Since the first and the second piping system have the same construction, the constructions in the first piping system will here be explained.

The first piping system is equipped with the following constructions.

First, there is provided a first conduit 131 which extends from the master cylinder 11 and which, by being branched midway, is connected at the forward ends of its branched portions to the first wheel cylinder 41 and the second wheel cylinder 42. This first conduit 131 constitutes a main flow passage that is used when a pressurized braking fluid that has been generated in the master cylinder 11 is transmitted to each of the wheel cylinders 41 and 42. That is, at a time of ordinary braking, the braking action is performed through this first conduit 131 with respect to the wheel cylinders 41 and 42.

In the first conduit 131, a first pressure increase control valve 31 and a second pressure increase control valve 32 that can respectively independently control the increases in the wheel cylinder pressures PL of the first wheel cylinder 41 and the second wheel cylinder 42 are disposed. That is, with respect to the first wheel cylinder 41, there is provided the first pressure increase control valve 31 that makes effective and ineffective the communication between the first wheel cylinder 41 and the master cylinder 11 while, on the other hand, with respect to the second wheel cylinder 42, also, there is similarly provided the second pressure increase control valve 32 that makes effective and ineffective the communication between the master cylinder 11 and the second wheel cylinder 42.

Also, on the first conduit 131, there is disposed a first proportioning control valve 30 that has been reversely connected between the master cylinder 11 and the portion at which the first conduit 131 is branched. This first proportioning control valve 30 allows the braking fluid to flow from the master cylinder 11 side to each of the wheel cylinders 41 and 42 side substantially with no attenuating action to braking fluid pressure. Conversely, the flow of the braking fluid from each of the wheel cylinders 41 and 42 side to the master cylinder 11 side is allowed while the wheel cylinder pressure is attenuated in proportion to the level of the master cylinder pressure PM. That is, the first proportioning control valve 30 enables the generation of a pressure which is higher than the master cylinder pressure PM of the master cylinder 11 on the wheel cylinders 41 and 42 side. It is to be noted that as this first proportioning control valve 30, there may be used a well-known proportioning control valve which was conventionally used to decrease the braking fluid pressure that is applied to the wheel cylinders of the rear wheels in order to make the braking force distribution between the front and rear wheels approximate to an ideal braking force distribution.

A first pressure decrease control valve 33 and a second pressure decrease control valve 34 that can respectively independently control the decreases in the wheel cylinder pressures PL of the first wheel cylinder 41 and the second wheel cylinder 42 are disposed in a pressure reduction conduit 132. That is, one end of each of the pressure reduction conduits 132 is connected to the first conduit 131 between the first pressure increase control valve 31 and the first wheel cylinder 41 and between the second pressure increase control valve 32 and the second wheel cylinder 42 and the other end thereof is connected to a first reservoir 35. On this pressure reduction conduit 132, there are disposed the first pressure decrease control valve 33 and the second pressure decrease control valve 34 that make effective and ineffective the communications between the wheel cylinders 41 and 42 and the first reservoir 35.

A first pump 36 which when the first or second pressure decrease control valve 33 or 34 has been controlled to cause the pressure reduction conduit 132 to communicate pumps up the braking fluid that is accumulated within the first reservoir 35 and discharges it into the first conduit 131 is provided. This first pump 36 discharges the braking fluid into the first conduit 131 which stands between the first proportioning control valve 30 and the first and second pressure increase control valves 31 and 32. Also, the first pump 36 can take in the braking fluid from the conduit between the master cylinder 11 and the first proportioning valve 30 through a second conduit 133, the first reservoir 35, and the pressure reduction conduit 132 as well as from the first and second wheel cylinders 41 and 42 through the first and second pressure decrease control valves 33 and 34.

Here, the construction of the first reservoir 35 will be explained.

This first reservoir has a first reservoir opening 356 into which the braking fluid having the pressure that is equal to the master cylinder pressure PM flows through the second conduit 133. A ball valve 351 is disposed from this reservoir opening 356 toward the interior side of the first reservoir 35. In order to move this ball valve 351 up and down, a rod 353 that has a prescribed stroke is provided so as to interlock with a piston 354 disposed in the first reservoir 35. This piston 354 is moved downward when the braking fluid that corresponds to the decrease in pressure of the first or second wheel cylinder 41 or 42 has flowed from a second reservoir opening 357 into the chamber 358. A spring 355 imparts an urging force to the piston 354 to thereby enable the flow of the braking fluid to an intake port of the pump 36 under a prescribed pressure.

Also, when the braking fluid has been accumulated in the chamber 358 whereby the piston 354 has been moved downward, the ball valve 351 is seated on a valve seat 352 to thereby interrupt the flow of the braking fluid between the intake port of the pump 36 and the master cylinder 11 side. As a result, when the braking fluid of a predetermined amount or more has been accumulated in the chamber 358, the first pump 36 initially takes in the braking fluid from the chamber 358 of the first reservoir 35. Also, when at a time of ordinary braking the brake pedal 10 is stepped on and as a result the pressurized fluid pressure has been generated in the master cylinder 11, if the amount of the braking fluid that flows from the first reservoir opening 356 to the chamber 358 by way of the second conduit 133 has reached the predetermined amount, no further braking fluid is allowed to flow into the chamber 358 to thereby eliminate the possibility of the ordinary braking action being impaired. It is to be noted that by adjusting the stroke of the rod 352 it can be made substantially impossible for the braking fluid to flow into the chamber 358.

In a case where the first pump 36 is driven whereby the braking fluid of the chamber 358 has become a prescribed amount or less, by the rod 353 pushing the ball valve 351 up, the ball valve 351 is separated from the valve seat 352, whereby communication is made between the intake port of the first pump 36 and the master cylinder 11 side.

While the elements that are disposed in the first piping system are as mentioned above, the elements that are disposed in the second piping system also have the structures, the functions and effects which are the same as those which are attainable by the elements in the first piping system. That is, first and second pressure increase control valves 21 and 22 in the second piping system correspond to the first and second pressure increase control valves 31 and 32, respectively, and first and second pressure decrease control valves 23 and 24 in the second piping system correspond to the first and second pressure decrease control valves 33 and 34, respectively. These valves realize the adjustment of the braking fluid pressure that is applied to a third wheel cylinder 40 provided for the front/left wheel FL and to a fourth wheel cylinder 43 provided for the rear/right wheel RR. Further, in the second piping system, a second proportioning control valve 20 is disposed and this valve corresponds to the first proportioning control valve 30 in the first piping system. Moreover, a second pump 26 and a second reservoir 25 that stand in the second piping system correspond to the first pump 36 and the first reservoir 35 in the first piping system, respectively.

It is to be noted that in a state of ordinary braking and at a time of pressure amplifying control as later described each valve is located at the position illustrated in FIG. 1A. The respective pressure increase control valves 21, 22, 31 and 32, respective pressure decrease control valves 23, 24, 33 and 34, and first and second pumps 26 and 36 are driven by receiving the signals from an ECU 100. The ECU 100 is equipped with a CPU, ROM, RAM, etc. as well as an input/output interface (I/O) that receives output signals from, for example, wheel speed sensors not illustrated that are equipped to the respective wheels.

Next, the control flow in the ECU 100 will be explained while referring to a flow chart illustrated in FIG. 2.

Upon, for example, ON-operation of an ignition switch not illustrated, the control flow is started. First, in step 100 the wheel speeds VW of the respective wheels are calculated. In subsequent step 110, the vehicle body speed VB is calculated based on these wheel speeds VW. At this time, the wheel speed VW of a driven wheel can be adopted as vehicle body speed VB or the vehicle body speed VB may be calculated from the output signal generated by a vehicle body acceleration sensor separately adopted.

In step 120, at least one parameter for executing anti-skid brake (ABS) control is calculated as an ABS control value based on the wheel speeds VW, vehicle body speed VB, and so on. As the ABS control value, there may be utilized the slip ratio SW of the wheel, the acceleration dVW of the wheel or the like.

In step 130, it is determined whether or not a brake switch not illustrated is made ON. That is, it is determined whether or not the brake pedal 10 has been stepped on and the stroke thereof has reached a predetermined stroke, whereby the vehicle is in a braking state by the wheel braking force applied to each wheel. Here, when it has been determined that the vehicle is not in the braking state, the processing operation returns to step 100 and repeats the control flow. On the other hand, when it has been determined that the vehicle is in the braking state, the processing operation proceeds to step 140.

In step 140, it is determined whether or not the pressure amplifying control that will be explained below in connection with step 150 is being executed. If the pressure amplifying control is being executed, the processing operation proceeds to step 160. On the other hand, if pressure amplifying control is not being executed, the processing operation proceeds to step 150, whereby this pressure amplifying control is started.

In step 150, the first and second pumps 26 and 36 are driven by receiving the signals from the ECU 100. That is, by means of the first and second pumps 26 and 36, the braking fluid is pumped from the first conduits 121 and 131 between the master cylinder 11 and the first and second proportioning control valves 20 and 30 through the first and second reservoirs 25 and 35 and the second conduits 123 and 133. The braking fluid that has been pumped in this way is discharged toward the first to fourth wheel cylinders 40 to 43. As a result of this, the braking fluid on the master cylinder 11 side is moved to the respective wheel cylinders 40 to 43 side of the first and second proportioning control valves 20 and 30. Since the master cylinder pressure PM is correspondingly decreased by the moved brake fluid, the reaction force that receives from the pedal when depressing the brake pedal 10 is decreased with the result that the brake pedal 10 becomes easier to further step in. That is, the operation burden for the crew to step the brake pedal 10 in is lightened.

In the meantime, through the attenuating action that is performed by the first and second proportioning control valves 20 and 30, the braking fluid pressure on the respective wheel cylinders 40 to 43 side is increased to a level that is higher than the level of the master cylinder pressure PM and maintained as it is. At this time, the first and second proportioning control valves 20 and 30 causes the pressurized braking fluid to flow toward the master cylinder 11 side by attenuating the pressure of the respective wheel cylinders 40 to 43 side so that the pressure of the respective wheel cylinders 40 to 43 side is higher than and proportionate to the pressure value of the master cylinder pressure PM. For this reason, the increasing rate of change in the wheel cylinder pressure PL is made variable in correspondence with a change in the master cylinder pressure PM. Accordingly, in this pressure amplifying control, there is enabled the amplifying of the wheel cylinder pressure that reflects the operation of the brake pedal performed by the crew.

Next, in step 160, it is determined whether or not the ABS control value that has been calculated in step 120 satisfies the ABS control starting value that can permit the start of ABS control. For example, it is determined whether or not the slip ratio SW of the wheel is not lower than 20%. Here, if this determination is made as YES, the processing operation proceeds to step 170 in which ABS control is executed while, on the other hand, if this determination is made as NO, the processing operation returns to step 100.

In step 170, the respective pressure increase control valves 21, 22, 31, and 32 and the respective pressure decrease control valves 23, 24, 33, and 34 are controlled according to the signals from the ECU 100. That is, when pressure decreasing control is performed to decrease the wheel cylinder pressure PL, the pressure increase control valve that is provided to the object wheel cylinder is brought to a state of making the communication ineffective and the pressure decrease control valve that is provided to the object wheel cylinder is controlled to a state of making the communication effective. When maintenance control is performed to maintain the wheel cylinder pressure PL, the pressure increase control valve and the pressure decrease control valve that are provided to the object wheel cylinder are both controlled to states of making the communication ineffective. Further, when pressure increasing control is performed, the pressure increase control valve that is provided to the object wheel cylinder is controlled to a state of making the communication effective and the pressure decrease control valve that is similarly provided is controlled to a state of making the communication ineffective. It is to be noted that pressure increasing/decreasing control and maintenance control of the wheel cylinder pressure PL can be independently executed at the respective wheel cylinders.

In step 180, it is determined whether or not the vehicle body speed VB has become lower than the predetermined vehicle body speed KVB. It is preferable that this predetermined vehicle body speed KVB be preset to an extent of, for example, 5 km/s or so which is the vehicle body speed that stands immediately before the stop thereof. It is to be noted that the predetermined vehicle body speed KVB is changeable according to the type of the vehicle and, in the case of, for example, vehicles of a truck system in which at a time of the vehicle being stopped large pitching motions occur, this predetermined speed KVB may be set to be at a value which is slightly greater. Here, if the determination has been made as YES, the processing operation proceeds to step 190 in which pitching motion control is executed. On the other hand, if the determination has been made as NO, the processing operation returns to step 160 in which determination is subsequently performed on the starting permission of ABS control.

In step 190, pitching motion control is executed. That is, the state where the processing operation has proceeded to this step 190 corresponds to a state where ABS control is performed with respect to at least one wheel and in addition the action that is performed by pressure amplifying control is exerted on all of the wheels.

Here, an explanation will be given of a case where the wheel cylinder pressures PL of the first and third wheel cylinders 41 and 40 on the both front wheels side are being adjusted by ABS control and in addition the second and fourth wheel cylinders 42 and 43 on the rear wheels side are both not being adjusted by ABS control. In this case, the increase of the braking fluid pressure in the first and third wheel cylinders 41 and 40 is limited by pulse pressure increase, maintenance or pressure decrease control being performed in ABS control. That is, braking fluid pressure amplified by pressure amplifying control is not directly applied to the wheel cylinders 40 and 41 of the front wheels. The braking fluid pressure that is applied to the second and fourth wheel cylinders 42 and 43 on the rear wheels side is in a state of being amplified as a result of the action of pressure amplifying control. In this state, when the wheel cylinders 40 and 41 on the front wheels side have had their pressures decreased, the braking fluid that is discharged from the wheel cylinders 40 and 41 due to the decrease in braking fluid pressure is accommodated into the respective reservoirs 25 and 35 and simultaneously is pumped up by the pumps to return into the first conduits 121 and 131. Since at this time the respective pressure increase control valves 21 and 31 on the front wheels side are kept in a state of making the communication ineffective, unless the rear wheels are subject to ABS control, the braking fluid that has been pumped up and discharged from the pumps 26 and 36 is caused to flow into the wheel cylinders 42 and 43 on the rear wheels side. That is, the braking fluid that has existed in the wheel cylinders 40 and 41 on the front wheels side is caused to flow to the wheel cylinders 42 and 43 on the rear wheels side. Accordingly, in such a state, the increase in the road surface reaction force that is received by the wheels of the front wheels side is suppressed or decreased and the road surface reaction force that is received by the wheels of the rear wheels side is increased. It is to be noted that when the wheel cylinder pressures of the front wheels side are being decreased by ABS control, the decreased braking force of the front wheels can be compensated for by the rear wheels.

The wording "pulse pressure increase control" means control that is made so as to increase the braking fluid pressure stepwise by repeatedly making the communication of the pressure increase control valves 21 and 31 effective and ineffective at predetermined intervals.

Next, an explanation will now be given of pitching motion control that is performed when ABS control is executed with respect to only one of the front wheels and no ABS control is performed with respect to any one of the rear wheels. In this pitching motion control, maintenance control or pulse pressure increase control is performed with respect to one of the front wheels that undergoes the execution of no ABS control. As a result of this, the increase of the braking fluid pressure is limited on the both front wheels, with the result that the increase in the road surface reaction force that is received by the front wheels is suppressed. In contrast to this, since the braking fluid pressure applied to the wheel cylinders 41 and 42 of the rear wheels is increased by pressure amplifying control, the road surface reaction force that is received by the rear wheels from the road surface is increased. At this time, in the piping system that is connected to the wheel cylinder of the front wheel to which no ABS control is performed but maintenance control or pulse pressure increase control is performed, when this pitching motion control has been started, the pressure increase gradient for increasing the wheel cylinder pressure of that front wheel is decreased. Therefore, the braking fluid that corresponds to this decrease in pressure increase gradient is moved to the rear wheel cylinder. Accordingly, the pressure increase gradient in the wheel cylinder pressure PL on the rear wheels side becomes large from when pitching motion control is started. As a result, the road surface reaction force that is received by the rear wheels from the road surface becomes greater.

As mentioned above, the conditions under which the pitching motion control is performed are firstly that pressure amplifying control is being executed so that at a time that is immediately before the stop of the vehicle there may occur a state where the wheel cylinder pressure PL can be increased with a responsiveness that is better than that with which the wheel cylinder pressure PL is increased by the depressing of the brake pedal; Secondly, that during pressure amplifying control being executed the left and right front wheels are subject to ABS control; And, thirdly, that when one of the left and right front wheels is not subject to ABS control, the wheel cylinder pressure of this front wheel is pulse-increase controlled or maintenance controlled to thereby limit the pressure increase gradient in the braking fluid. In this way, the increase in the road surface reaction force that is received by the front wheels from the road surface is limited and the road surface reaction force that is received by the rear wheels from the road surface is increased.

It is to be noted that ABS control may be executed with respect to the rear wheels so that the braking fluid pressure applied to the respective wheel cylinders 42 and 43 of the rear wheels is adjusted. However, as described later with reference to FIG. 3, since pitching motion control can be realized by the reaction force that is received by the rear wheels from the road surface being increased by the increase in the pressure increase gradient with respect to the rear wheel cylinders and by the reaction force that is received by the front wheels being slightly decreased by the decrease in the pressure increase gradient with respect to the front wheel cylinders, it is preferable that the rear wheels be brought not to a state of being locked as much as possible.

When ABS control is executed with respect to at least one wheel, the following effect can be obtained by executing pitching motion control. That is, since pressure amplifying control acts on the respective cylinders in correspondence with the master cylinder pressure that is generated in response to the state of step-in of the brake pedal by the crew, if no ABS control is in progress, the vehicle is in a state of the crew not requiring the exertion of so large vehicle braking force. In such a case, it can be presumed that no so large a pitching motion occurs in the vehicle body. Further, for example, if only one wheel is under ABS control pitching motion control is performed. However, pitching motion control performed during only one front wheel being under ABS control is weaker than that performed during the front two wheels being under ABS control, which results in that there is performed pitching motion control that is in harmony with the state of occurrence of the pitching motion.

Next, the principle of the pitching motion being suppressed will be explained.

Ordinarily, the braking force distribution with respect to the front and rear wheels of the vehicle is set to be such that the front wheels are locked precedingly to the rear wheels. Since when the vehicle is braked the load of the vehicle body is shifted to the front wheels side, a larger gripping force on the road surface can be obtained on the side of the front wheels than on the side of the rear wheels, with the result that the front wheels are difficult to lock. Accordingly, the wheel braking force that is exhibited by the front wheels is set to be larger by a prescribed magnitude than the wheel braking force that is exhibited by the rear wheels. For example, by applying to the rear wheel cylinders the braking fluid pressure which is lower by a predetermined level than the braking fluid pressure which causes the front wheels to exhibit the wheel braking force, the wheel braking force that is applied to the rear wheels can be made smaller than the wheel braking force that is applied to the front wheels. At this time, since as mentioned above the front wheels must be precedingly locked because of the vehicle stability at a time of braking, the braking fluid pressure that is applied to the wheel cylinders of the rear wheels is set by using as a basis the braking fluid pressure applied to the wheel cylinders of the front wheels. That is, the braking fluid pressure is distributed to the rear wheel cylinders as being lower with a certain extent of margin than the braking fluid pressure that enables the rear wheels to exhibit maximum wheel braking force in order to satisfy the requirements of the front wheels being precedingly locked. For example, the braking fluid pressure applied to the wheel cylinders of the rear wheels is attenuated from the master cylinder pressure by the known proportioning control valves. Accordingly, in an ordinary case, it is difficult to apply the braking fluid pressure to the rear wheel cylinders up to the braking fluid pressure that maximizes the braking force of the rear wheels and, in many cases, the braking fluid pressure which at a time that is immediately before the stop of the vehicle is applied to the rear wheel cylinders has a certain extent of margin to the braking fluid pressure at which the rear wheels have an excessive slip. For this reason, if, as mentioned above, the braking fluid pressure increase gradient for increasing the braking fluid pressure in the rear wheel cylinders is made large so as to increase the braking fluid pressure that corresponds to at least this certain extent of margin, the road surface reaction force that is received by the rear wheels is increased whereby it is possible to enhance the braking performance up to around the maximum of the road surface reaction force that can be received by the rear wheels. As a result of this, there is realized the action of drawing the vehicle body toward the road surface at the rear side of the vehicle body.

Next, the function and effect that are attained by pitching motion control in step 190 will be explained according to the variation in the motion of the vehicle body illustrated in FIG. 3.

Figure 3A:
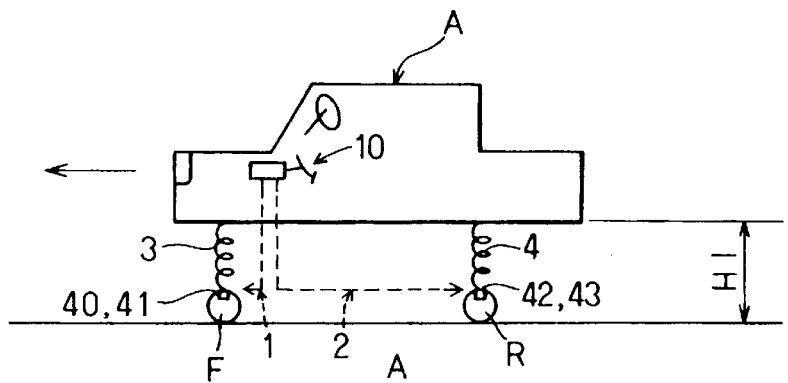
FIGS. 3A, 3B, 3C and 3D are views illustrating the function and effect of the first embodiment.

First, the running state of the vehicle that stands before the vehicle being braked is illustrated in FIG. 3A. A vehicle body A is running toward the left side of the illustration. At this time, a suspension 3 that is mounted on a front wheel F and a suspension 4 that is mounted on a rear wheel R have the same length and so the height of the vehicle body A as measured from the ground surface is represented by H1.

Figure 3B:
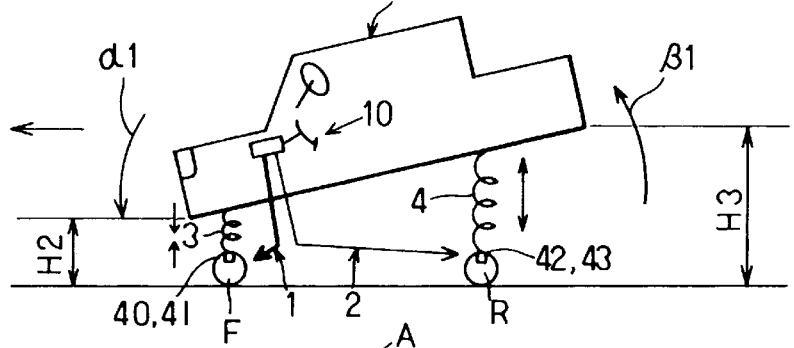

Next, the motion of the vehicle body that occurs when the crew has depressed the brake pedal 10 and has thereby applied braking force to the vehicle body A is illustrated in FIG. 3B. Ordinarily, the braking force distribution of the vehicle is set to be such that the front wheel F is brought to a state of being locked earlier than the rear wheel R. That is, the braking force caused by the braking fluid pressure upon the front wheel F is set to be greater than the braking force caused by the braking fluid pressure upon the rear wheel R.

In the meantime, when the vehicle is braked, a shift of the load occurs in the vehicle body A, whereby a force that is indicated by an arrow α1 is applied to the front side of the vehicle body A and a force that is indicated by an arrow β1 acts on the rear side of the vehicle body A. As a result of this, the suspension 3 of the front wheel F is contracted, whereby the height of the vehicle body of the front side as measured from the ground surface becomes H2 (H1>H2). On the other hand, the suspension 4 of the rear wheel R is extended, whereby the height of the vehicle body of the rear side as measured from the ground surface becomes H3. At this time, the relation of H2<H3 is held in terms of the height of the vehicle body A.

Figure 3C:
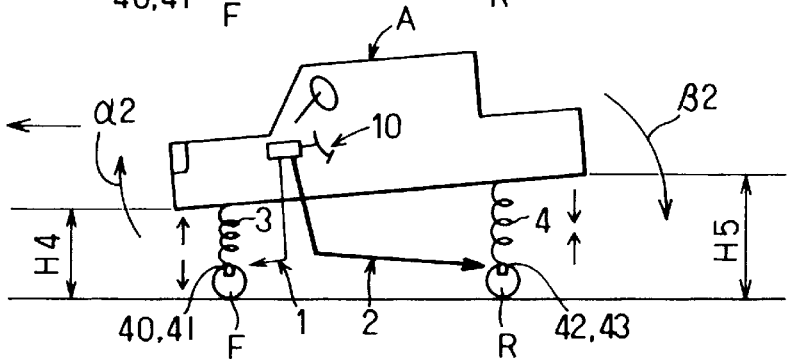
Figure 3D:
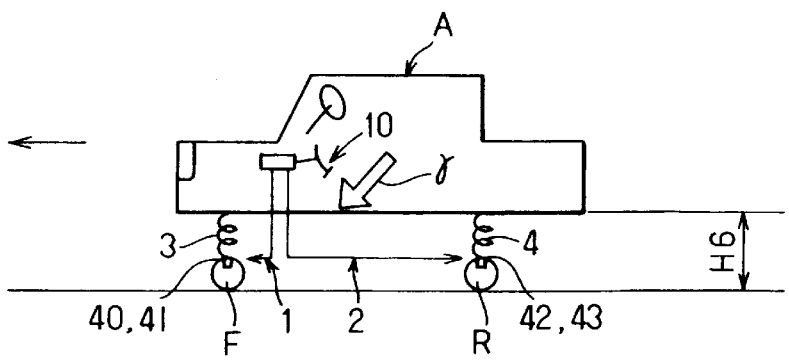

The motion of the vehicle body A that occurs when the vehicle body speed VB has become smaller than the predetermined vehicle body speed, that is, as a result of the above-mentioned pitching motion control is illustrated in FIGS. 3C and 3D.

First, the increase in the braking fluid pressure applied to the respective wheel cylinders 40 and 41 of the front wheels is limited so as to become equal to or decreased from the pressure increase gradient in the state illustrated in FIG. 3B. Also, through the performance of pressure amplifying control, the braking fluid pressure applied to the wheel cylinders 42 and 43 of the rear wheels is increased with an excellent responsiveness, whereby the pressure increase gradient is increased compared to that in the state illustrated in FIG. 3B. This is because the braking fluid that has been pumped up from the first and second reservoirs 35 and 25 or from the master cylinder 11 side is discharged to the wheel cylinders side of the first and second proportioning control valves 30 and 20. In addition, since the wheel cylinders 40 and 41 of the front wheels are subject to pulse pressure increasing control, pressure decreasing control and maintenance control during ABS control, or maintenance control or pulse pressure increase control irrespective during no ABS control, the discharged braking fluid is caused to flow more to the wheel cylinders 42 and 43 of the rear wheels. Accordingly, the pressure increase gradient in the braking fluid pressure of the wheel cylinders 42 and 43 of the rear wheels becomes increased, with the result that the wheel braking force that is exhibited by the rear wheels can be made approximate to a value that stands on the ideal braking force distribution line. In this way, the road surface reaction force that is received by the rear wheel R from the road surface becomes greater than the road surface reaction force that was received in the state illustrated in FIG. 3B. Accordingly, the braking force caused by the braking fluid pressure upon the front wheel F is decreased while, on the other hand, the braking force caused by the braking fluid pressure upon the rear wheel R is increased. As a result of this, the braking force that is applied by the front wheels to the vehicle body is maintained or decreased while, on the other hand, the braking force that is applied by the rear wheels to the vehicle body is increased.

The motion of the vehicle body A that occurs when the road surface reaction force that is received by the front wheels from the road surface tends to be suppressed or decreased and the road surface reaction force that is received by the rear wheels is increased in the above-mentioned way is such that the front side makes its motion as indicated by an arrow α2 and the rear side makes its motion as indicated by an arrow β2. This is because due to an increase in the wheel braking force generated by the rear wheels R the rear side of the vehicle body A is attracted toward the ground surface so as for the suspension 4 of the rear side to be contracted and, as the counteraction of this motion, the front side of the vehicle body A is slightly lifted up. As a result of this, the height of the vehicle body A as measured from the ground surface is such that the height of the front side thereof is H4 (H2<H4 <H1) and the height of the rear side thereof is H5 (H3>H5).

And, as illustrated in FIG. 3D, when the vehicle is stopped or immediately after the vehicle is stopped, the motion of the vehicle body A that has been explained using FIG. 3C converges with the result that the vehicle body A becomes substantially parallel with the ground surface and simultaneously the vehicle body A moves as if it has sunk substantially as a whole. That is, the force indicated by an arrow γ acts substantially on the center of the vehicle body. That is, the lift-up of the rear side of the vehicle body A and the sink of the front side thereof are suppressed. For this reason, when the vehicle is stopped, the pitching motion in which the vehicle body A is moved as if its forward side is forcedly depressed is suppressed, whereby it is suppressed to promote forward fall down of the crew's body by the pitching motion of the vehicle body. Also, by this pitching motion having been suppressed, immediately after the vehicle body A has been stopped, there occurs no swing-back of the vehicle body due to the pitching motion, Therefore, the crew's body is not be swung back to the rear side by the swing-back in the pitching motion. That is, with respect to the crew's body, it results that substantially only the deceleration alone resulting from the vehicle being braked is applied. In consequence, the force of acting on the crew's body as a result of the load shift occurring on the vehicle body can be suppressed as much as possible.

Next, a second embodiment of the present invention will be explained with reference to FIGS. 4 and 5.

Figure 4A:
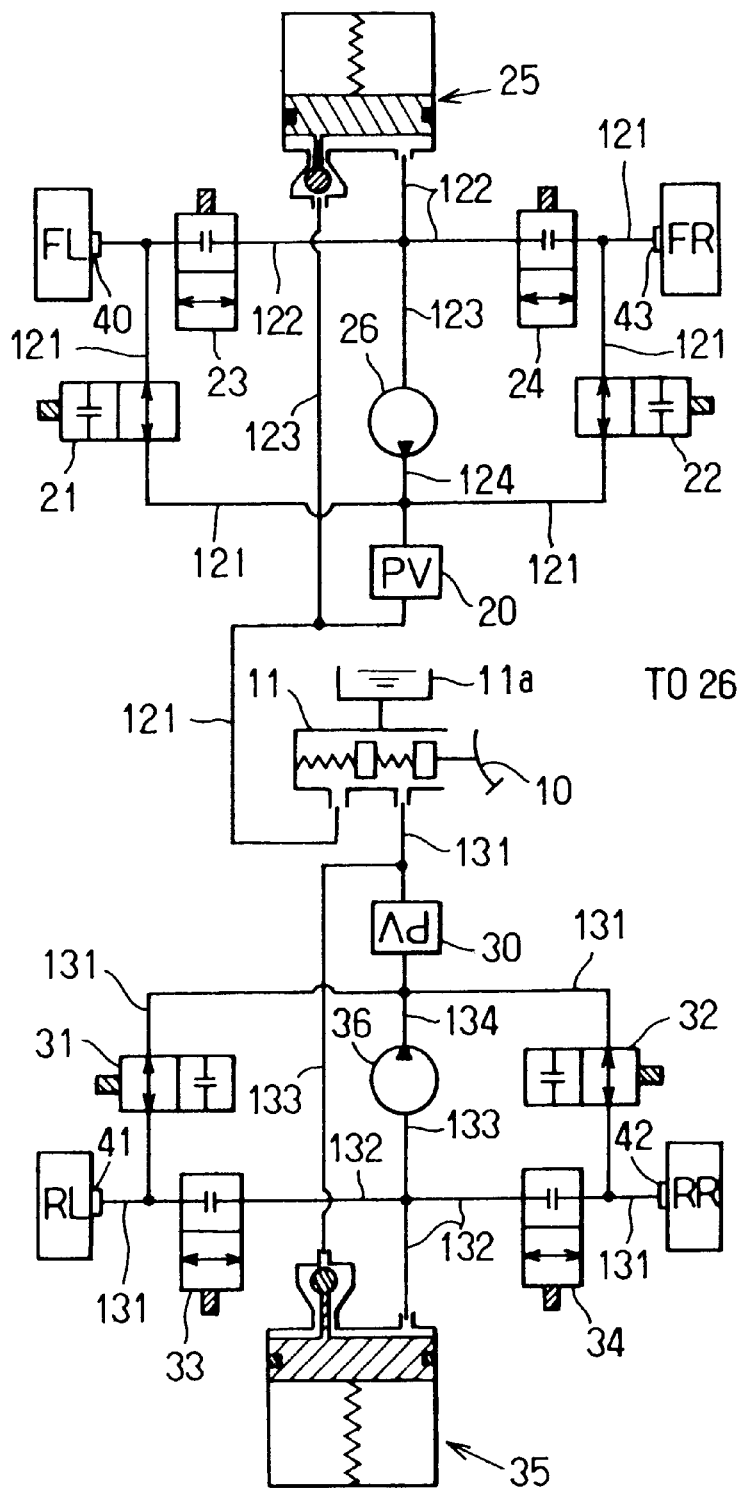
FIGS. 4A and 4B are schematic diagrams illustrating a construction of a second embodiment.
Figure 4B:
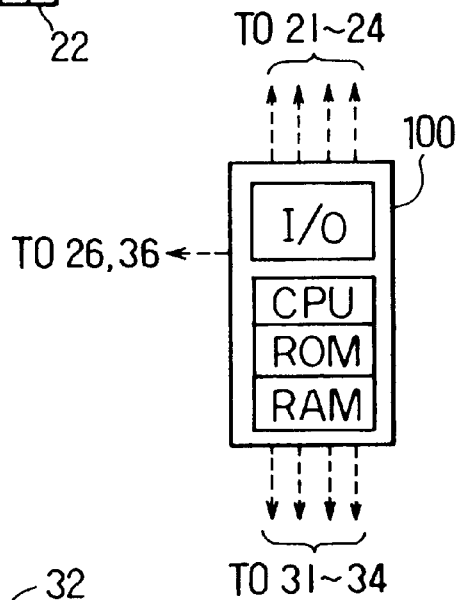

FIGS. 4A and 4B illustrate an example wherein the present invention has been applied to an on-vehicle brake system that is equipped with a front and rear piping systems that make communication between respective wheel cylinders 40 and 43 of the front/right wheel FR-front/left wheel FL and the master cylinder 11 and communication between respective wheel cylinders 41 and 42 of the rear/right wheel RR-rear/left wheel RL and the master cylinder 11, respectively.

In FIGS. 4A and 4B, the wheel cylinder of the rear/left wheel RL is a first wheel cylinder 41 and the wheel cylinder of the rear/right wheel RR is a second wheel cylinder 42. Also, the wheel cylinder of the front/left wheel FL is a third wheel cylinder 40 and the wheel cylinder of the front/right wheel FR is a fourth wheel cylinder 43. Regarding the other constructions, since the constructions which have the same functions and effects as those in the above-mentioned first embodiment are denoted by the same reference symbols, detailed descriptions thereof are omitted here.

Next, the processing operation that is performed by the ECU in this second embodiment will be explained while referring to the flow chart illustrated in FIG. 5.

The control flow starts upon, for example, ON-operation of an ignition switch of the vehicle. First, the wheel speeds VW of the respective vehicle wheels are calculated in step 500. Next, in step 510, the vehicle body speed VB is calculated.

In step 520, calculation is performed of the parameter that is used to determine on the execution of pressure amplifying control that will be described in detail in connection with step 560. As this parameter, for example, the deceleration dVB of the vehicle body or the deceleration dVW of the vehicle wheel can be adopted.

Next, in step 530, calculation is performed of the parameter that is used to determine on the execution of ABS control.

In step 540, it is determined whether or not the brake switch is "ON". When the determination is made as YES, the processing operation proceeds to step 550 and, when the determination is made as NO, returns to step 500.

In step 550, it is determined whether or not the parameter for determining on the execution of pressure amplifying control satisfies an execution-permitting reference value. That is, for example, it is determined whether or not the deceleration dVB of the vehicle body is greater than a predetermined deceleration (0.5 G) and, when the determination is made as YES, the pressure amplifying permission is set. That is, pressure amplifying control may be executed when the force of the crew operating the brake pedal is greater than predetermined value whereby a large deceleration of the vehicle body is needed. Also, calculation may be performed of the decelerations dVW of the respective vehicle wheels, whether or not each of these decelerations dVW of the vehicle wheels is greater than a predetermined deceleration may be determined. In this case, pressure amplifying control is executed in the front piping system for the front wheel cylinders when at least one of the front wheels is greater than the predetermined deceleration and pressure amplifying control is executed in the rear piping system for the rear wheel cylinders when at least one of the rear wheels is greater than the predetermined deceleration. Further, if the vehicle wheel decelerations dVW of the both front and rear wheels are greater than the predetermined deceleration, pressure amplifying control is executed in each of the front and rear piping systems for the front wheels side and for the rear wheels side. If the vehicle wheel deceleration dVW is used as the execution-determining parameter for determining on the execution of pressure amplifying control in this way, since the vehicle wheel deceleration has correlation with the road surface friction coefficient ($\mu$) of the road, there can be executed pressure amplifying control that corresponds to the road surface $\mu$ of the travel road of the vehicle. In this way, in step 550, determination is made on the execution-permitting reference value for permitting the execution of pressure amplifying control, whereby unless the execution-determining parameter satisfies the execution-permitting reference value for pressure amplifying control, the processing operation proceeds to step 570. On the other hand, if satisfying the execution-permitting reference value therefor, the processing operation proceeds to step 560.

In step 560, pressure amplifying control is executed in accordance with the result that has been determined on in step 550. That is, if permission is being made of the execution of pressure amplifying control in the front piping system for the front wheels side, the second pump 26 is driven. As a result, the braking fluid is pumped up from the master cylinder side, whereby the braking fluid is discharged to the third and fourth wheel cylinders 40 and 43 side of the second proportioning control valve 20. In addition, the braking fluid pressure in the third and fourth wheel cylinders is amplified in proportion to the master cylinder pressure PM and maintained by the second proportioning control valve 20. In this way, the braking fluid pressure that is applied to the respective wheel cylinders 40 and 43 is increased. It is to be noted that pressure amplifying control in the rear piping system for the rear wheels side can also be similarly realized.

Next, in step 570, it is determined whether or not the ABS control permission parameter satisfies a predetermined reference value with respect to each wheel. Here, if the determination is made as YES, the processing operation proceeds to step 580 in which ABS control is executed with respect to the relevant wheel. Also, if the determination is made as NO, the processing operation proceeds to step 590.

In step 590, it is determined whether or not the vehicle body speed VB is smaller than the predetermined speed KVB. Here, if the determination is made as NO whereby it is determined that the vehicle is not yet in a state of being immediately before the vehicle is stopped, the processing operation returns to step 500. If the determination is made as YES, the processing operation proceeds to step 600.

In step 600 and the steps that succeed thereafter, execution is made of pitching motion control in accordance with the state of pressure amplifying control being executed and the state of ABS control being executed.

That is, in step 600, it is determined whether or not pressure amplifying control is presently being executed. At this time, since when the vehicle is braked the load of the vehicle body is ordinarily shifted to the front wheels, pressure amplifying control with respect to the front piping system for the front wheels side is preferentially executed compared to pressure amplifying control with respect to the rear piping system for the rear wheels side. Accordingly, since there does almost not exist the state of pressure amplifying control being executed only in the rear piping system for the rear wheels side, when in step 600 determination is made as YES, it can be considered that pressure amplifying control is being executed in at least the front piping system for the front wheels side. At this time, the processing operation proceeds to step 610 in which it is determined whether or not ABS control is being executed.

Here, if ABS control is being executed, it is presumed that ABS control is being executed of at least the front wheel. That is, since the braking force distribution with respect to the front and rear wheels side is ordinarily set so that the front wheels are precedingly locked, ABS control is initially executed of the front wheels.

Accordingly, first pitching motion control in step 620 that is executed in the above-mentioned state is executed as follows. That is, when ABS control is being executed with respect to only the both front wheels, the braking fluid pressure in the wheel cylinders 40 and 43 of the front wheels are decreased, maintained, or increased (due to pulse pressure increasing control), namely the pressure increase gradient in the braking fluid pressure has been already limited as a result of the execution of ABS control even when the braking fluid pressure has been amplified by pressure amplifying control. Also, if ABS control is executed to only one wheel of the front wheels, maintenance control or pulse pressure increasing control irrespective of ABS control is executed to the other front wheel that no ABS control is applied. As a result of this, the pressure increase gradient in the braking fluid pressure that is applied to the both wheel cylinders 40 and 43 of the front wheels side is limited. By this first pitching motion control, the increase in the road surface reaction force that is received by the front wheels F from the road surface is suppressed. Simultaneously, when no ABS control is being executed in the rear wheels, the wheel cylinder pressure of the rear wheels is amplified through pressure amplifying control to be performed with respect to the wheel cylinders 42 and 43 of the rear wheels side. That is, when no pressure amplifying control is being executed with respect to the rear piping system for the rear wheels side, pressure amplifying control is here started with respect to the rear piping system for the rear wheels side. As a result of this, the pressure can be supplemented with respect to the braking fluid pressure that has been generated only by the step-in force exerted by the crew. This makes it possible to increase up to around a maximum limit the road surface reaction force that is received by the rear wheels from the road surface. By control being performed in this way, it is possible to realize the motion of the vehicle body that has been explained in connection with FIGS. 3A to 3D and thereby to suppress the pitching motion that occurs in the vehicle body. It is to be noted that, in this first pitching motion control, when all of the four wheels are subject to ABS control pitching motion control is not executed. This is because when ABS control is performed with respect to the both rear wheels no further road surface reaction force can be increased at the rear wheels. That is, the increase in the braking fluid pressure applied to the wheel cylinders 41 and 42 of the rear wheels in pitching motion control is executed when at least one of the rear wheels has a certain extent of margin to a maximum road surface reaction force which can be received by each rear wheel from the road surface. At this time, even if the wheel cylinder pressure of the front wheels is maintained or gradually increased by pulse pressure increase control whereby the front wheels receives only abroad surface reaction force that is smaller than the road surface reaction force received by the front wheels when the pressure increase control valves 21 and 22 are being opened (make the communication effective), the road surface reaction force that is decreased at the front wheels is compensated for by the road surface reaction force received by the rear wheels. Therefore, there is no likelihood of the crew feeling that the vehicle body is short of the braking force.

Also, when it has been determined in step 610 that no ABS control is being executed, the processing operation proceeds to step 630 in which second pitching motion control is executed. In this second pitching motion control, first, if pressure amplifying control is not being executed in the rear piping system for the rear wheels, there is started pressure amplifying control in the rear piping system for the rear wheels to thereby cause an increase in the reaction force that is received by the rear wheels from the road surface. Maintenance control or pulse pressure increase control is executed with respect to the wheel cylinders 40 and 43 of the respective front wheels to thereby suppress the increase in the road surface reaction force that is received by the front wheels from the road surface.

When in step 600 it has been determined that pressure amplifying control is not being executed with respect to both of the front and rear wheels, the processing operation proceeds to step 640 in which it is determined whether or not ABS control is being executed. Here, if it has been determined that ABS control is being executed, the processing operation proceeds to step 650 in which third pitching motion control is executed. At this time, if the wheel cylinder pressure PL of the wheel cylinders 41 and 42 of the rear wheels is not being subject to adjustment made by ABS control, pressure amplifying control is executed in the rear piping system for the rear wheels. This can increase the road surface reaction force that is received by the rear wheels from the road surface, thereby enabling the generation of the acting force indicated by β2 which acts to attract the rear side of the vehicle body toward the ground surface, thereby enabling the suppression of the pitching motion that occurs in the vehicle body. Further, by this pressure amplifying control executed immediately before the stop of the vehicle body, the vehicle can be stopped at least somewhat earlier than a position where the vehicle has been destined to be stopped by the crew, whereby the braking of the vehicle can be controlled on a safety side. It is to be noted that, in this third pitching motion control, also, when ABS control is being executed with respect to the both wheel cylinders 41 and 42 of the rear wheels, pitching motion control is not executed.

When in step 640 determination has been made as NO, fourth pitching motion control is executed in step 660. In this fourth pitching motion control, pressure amplifying control is executed only in the rear piping system for the rear wheels, whereby the pitching motion can be suppressed.

Because, as mentioned above, pitching motion control is executed depending on the execution-states of pressure amplifying control and ABS control, it is possible to suppress with a high accuracy the pitching motion that occurs in the vehicle body and it is possible to more improve the crew's feeling when the vehicle is braked.

The present invention is not limited to the above-mentioned embodiments and can be modified in various ways.

For example, in the above-mentioned second embodiment, when the execution of pressure amplifying control has been permitted, because it is considered that a high vehicle braking is required by the crew, the braking fluid pressure that is applied to the left and right wheel cylinders 40 and 43 of the front wheels may be increased so that ABS control is performed with respect to the front left and right wheels through the execution of pressure increment control. In this case, when pitching motion control is performed so that, immediately before the stop of the vehicle, that is, when the vehicle body speed VB has become lower than the predetermined speed KVB, pressure amplifying control is executed with respect to the wheel cylinders 41 and 42 of the both rear wheels, it is possible to suppress the pitching motion that occurs in the vehicle body. In addition, it is also possible to suppress the swing-back motion of the vehicle body that occurs immediately after the stop of the vehicle. It is to be noted that pressure amplifying control with respect to the both rear wheels may be executed before the vehicle body speed VB becomes lower than the predetermined speed KVB.

Also, the above-mentioned pitching motion control may be executed not only at a time immediately before the vehicle being stopped but also by the timing with which the pitching motion becomes great, which is determined as follows.

Figure 5:
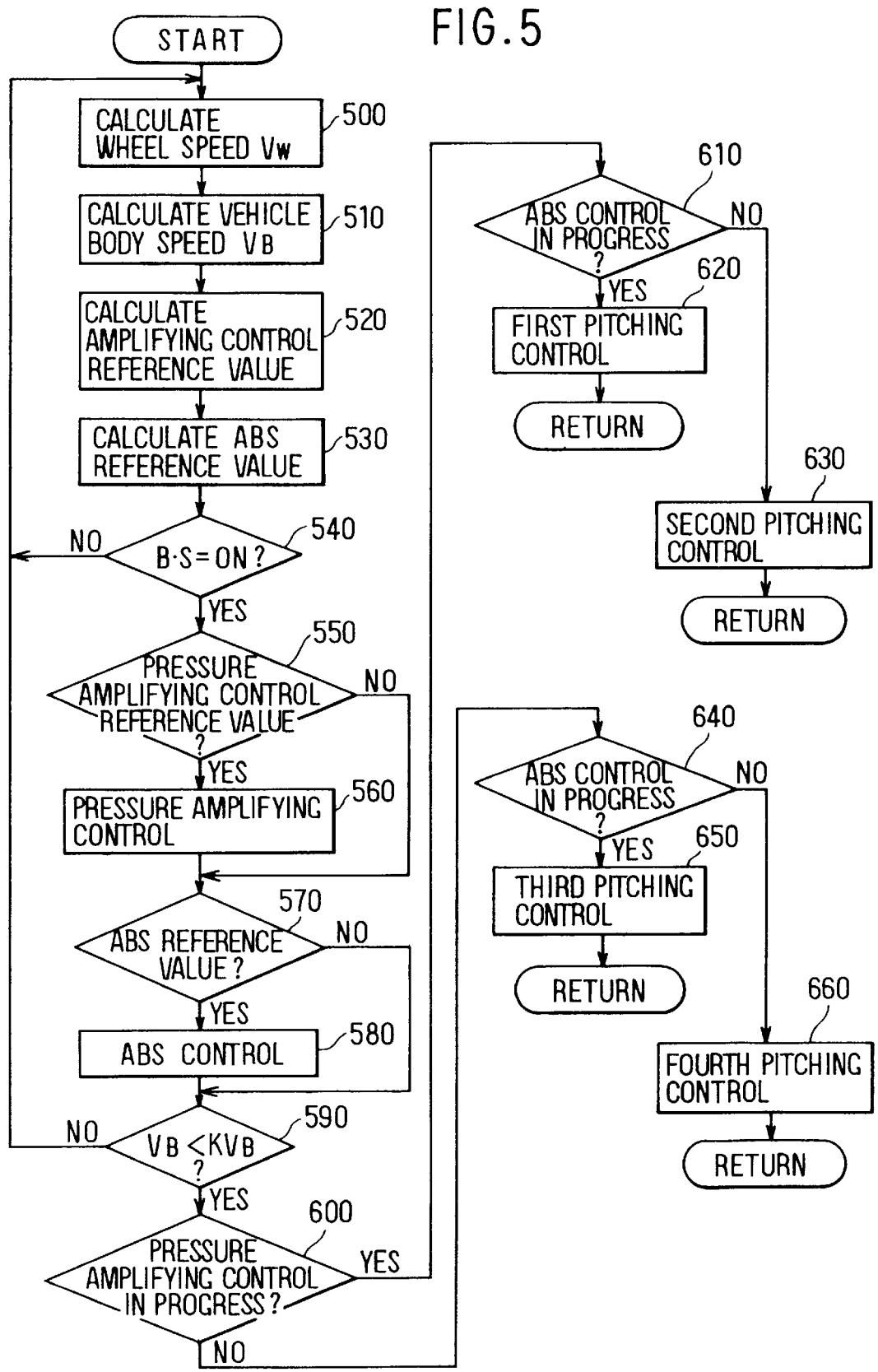
FIG. 5 is a flow chart illustrating a control flow in the second embodiment; and, FIG. 6 is a graph illustrating the characteristics of a second proportioning control valve 20.

For example, although in step 180 in FIG. 2 and in step 590 in FIG. 5 determination is made on whether or not the vehicle body speed VB has become lower than the predetermined speed KVB, the parameter that has been explained, for example, in connection with step 520 in FIG. 5 may be used to determined the timing with which the pitching motion becomes great. That is, if the vehicle body deceleration dVB becomes greater than a predetermined value, the shift of the load of the vehicle body becomes considerably wide, with the result that it can be presumed that the pitching motion that occurs in the vehicle body becomes large to some extent. For this reason, it can be determined in step 180 in FIG. 2 and in step 590 in FIG. 5 whether or not the vehicle body deceleration dVB is greater than the predetermined deceleration KdVB. Also, it can be determined in step 180 in FIG. 2 and in step 590 in FIG. 5 whether or not the master cylinder pressure is higher than a predetermined value. This is because if the master cylinder pressure is higher than the predetermined value, since it is considered that a large braking force is being applied to the vehicle body, it can be presumed that large pitching motion occurs. Also, it may be determined in step 180 in FIG. 2 and in step 590 in FIG. 5 whether or not the step-in speed of the brake pedal operated by the crew, i.e., the rate of change in the pedal stroke is larger than a predetermined value. This is because if the rate of change in the pedal stroke is larger than the predetermined value, it can be presumed that the vehicle be in a state of a rapid braking being done where the brake pedal is being rapidly stepped in by the crew, whereby, since the braking force is rapidly applied to the vehicle body, there is the high likelihood of the pitching motion occurring. Also, it may be determines in step 180 in FIG. 2 and in steps 590 in FIG. 5 whether or not the change in increase in the master cylinder pressure is higher than a predetermined value. This is because, as in the case of the rate of change in the pedal stroke, if the change in increase in the master cylinder pressure is greater than the predetermined value, the vehicle can be presumed to be in a state of a rapid braking being done, whereby, since the braking force is rapidly applied to the vehicle body, there is the high likelihood of the pitching motion occurring. It is to be noted that if it is arranged to obtain the timing with which pitching motion control is started by combining a plurality of these parameters with each other, it is possible to start pitching motion control with a higher accuracy. Also, when using these parameters, it may be added to the brake system a master cylinder pressure sensor, a vehicle body acceleration sensor and a pedal stroke sensor.

The setting and operation of pressure amplifying control in the front piping system for the front wheels will now be explained with reference to FIG. 6.

Figure 6:
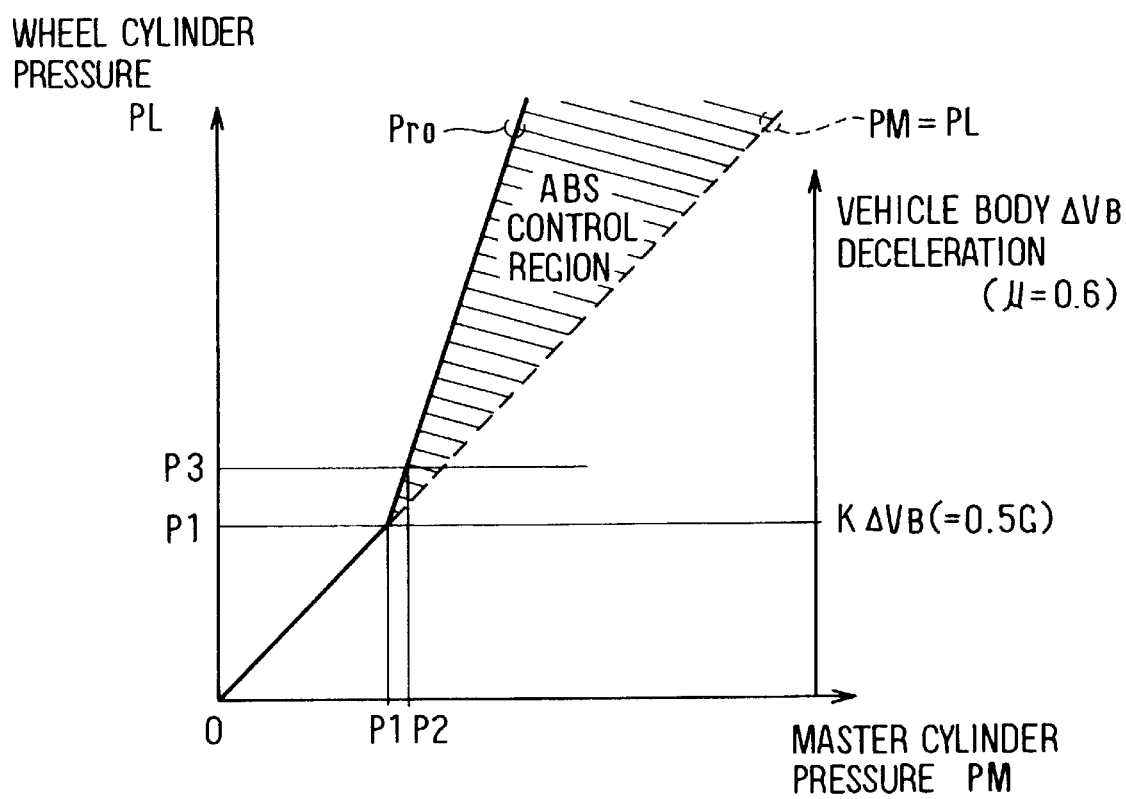

FIG. 6 is a graph illustrating the characteristic of the second proportioning control valve 20 in the front piping system for the front wheels and the relationship between the wheel cylinder pressure PL and the vehicle body deceleration dVB. Here, a split-point pressure of the second proportioning control valve 20 is set to be a pressure P1 and the parameter and execution-permitting reference value for executing pressure amplifying control are set beforehand so that this pressure amplifying control may be executed when the master cylinder pressure PM has reached this pressure P1. For example, a predetermined vehicle body deceleration KdVB is set so that when the master cylinder pressure PM has reached the pressure P1, the vehicle body deceleration dVB on the road having an intermediate friction coefficient ($\mu$) may be equal to or greater than the predetermined deceleration KdVB. When the master cylinder pressure PM has become higher than the pressure P1 and, as a result, pressure amplifying control has been executed, as mentioned above the wheel cylinder pressure PL is amplified in proportion to the master cylinder pressure PM as indicated by a line Pro. In this case, if the master cylinder pressure PM has increased up to a pressure P2, the wheel cylinder pressure PL is largely increased from the pressure P1 to a pressure P3. Note that, when the crew has not loosened the step-in of the brake pedal as a result of his requiring a larger vehicle braking force even after the execution of the pressure amplifying control, the master cylinder pressure PM can be made to be the pressure P2 with a small step-in force applied to the brake pedal due to the reaction force of the pedal being decreased by the braking fluid moved from the master cylinder 11. At this time, the discharging power of the second pump 26 and the attenuating ratio of the proportioning control valve 20 to braking fluid pressure transmitted from the wheel cylinder side to the master cylinder side, in other words, the pressure amplifying ratio from the master cylinder pressure PM to the wheel cylinder pressure PL as viewed from the master cylinder side are set so as for the wheel cylinder pressure PL to reach the pressure P3 in response to the master cylinder pressure of the pressure P2. It is to be noted that if the pressure P3 is set to be enough to cause the front wheels to have tendencies to be locked on the road surface higher than the intermediate $\mu$ road surface, ABS control is performed with respect to the respective front wheels and in addition pressure amplifying control is performed with respect to the respective rear wheels. Accordingly, at a time immediately before the vehicle being stopped, the pitching motion can be suppressed so long as a certain extent of margin exists for the road surface reaction force that is received by the rear wheels from the road surface. That is, on the side of the front wheels, there is maintained a state in which the front wheels receives substantially a maximum road surface reaction force and, in addition, on the side of the rear wheels, the road surface reaction force is increased within a region of the margin to the maximum road surface reaction force that can be received by the rear wheels, whereby the pitching motion is suppressed.

It is to be noted that setting the characteristic of the proportioning control valve in this way may be applied to the respective proportioning control valves 20 and 30 of the first embodiment.

Further, in the embodiments that have been explained above, when only one front wheel is being ABS-controlled, pulse pressure increase control or maintenance control was executed with respect to the other front wheel. However, when at least one wheel is being ABS-controlled, because the increase in the road surface reaction force that is received by this wheel from the road surface is limited, although the effect of suppressing the pitching motion is somewhat inferior to that which is attainable when the both left and right front wheels are being ABS-controlled, or pulse pressure increase control or maintenance control is performed with respect to the other wheel with no ABS control being executed, this effect can be exhibited even if pulse pressure increase control or maintenance control is not performed to the other wheel.

Also, in the above-mentioned embodiments, the explanation has been given, mainly in the brake system being capable of performing ABS control, of pitching motion control that is executed through the adjustment of the braking fluid pressure of the front wheels side and through the amplification of the braking fluid pressure of the rear wheels side made by pressure amplifying control. However, in the brake system being capable of performing only pressure amplifying control, also, in order to suppress the pitching motion, as pitching motion control, the braking fluid pressure of the rear wheels may be amplified from the master cylinder pressure by pressure amplifying control at a time immediately before the vehicle body being stopped. That is, even if only the force indicated by the arrow β2 in FIG. 3C is acted on the rear side of the vehicle without the road surface reaction force of the front wheels adjusted by controlling the wheel cylinder pressure of the front wheels side, the pitching motion can be suppressed to a certain extent.

Further, when the braking fluid pressure of the front wheels side is decreased by ABS control, ABS control may be changed over to maintenance control or to pulse pressure increase control, to limit the increase in the road surface reaction force that is received by the front wheels from the road surface. This is because, since the vehicle is in a state of immediately before the vehicle is stopped, even if the front wheels are brought to a locking state, the braking distance is almost not extended.

Also, pressure amplifying control may be executed as follows.

For example, in the construction that has been explained in connection with FIG. 4A, the vehicle wheel braking force that occurs on the respective vehicle wheels when no pressure amplifying control is being executed is set to be in the following relationship. That is, the vehicle wheels braking force that is exhibited by the front wheels (which corresponds to the road surface reaction force that is received by the front wheels) is set to be greater than the vehicle wheels braking force that is exhibited by the rear wheels (which corresponds to the road surface reaction force that is received by the rear wheels). This is because, since the load shift occurs at a time of the vehicle being braked, the load becomes greater on the front wheels side, with the result that even when a great vehicle wheel braking force has been applied to the front wheels compared to the rear wheels, the front wheels are not locked earlier than the rear wheels.

It is to be noted that the ratio of the vehicle wheel braking forces which, when the front wheels and the rear wheels are simultaneously locked, are exhibited by the front wheels and the rear wheels is an ideal braking force distribution ratio. However, when the rear wheels are locked earlier than the front wheels, the spin moment is produced with the result that the vehicle body becomes unstable. For this reason, the vehicle wheel braking force that is applied to the rear wheels is set and designed to be smaller by a predetermined magnitude than that which corresponds to this ideal braking force distribution ratio. Further, since the vehicle wheel braking force is generated by the braking fluid pressure, if the braking fluid pressure of the front wheels side and the braking fluid pressure of the rear wheels side are equal and the diameters of the wheel cylinders, etc. also are equal, it results that the same vehicle wheel braking force can be exhibited on each side of the front wheels and the rear wheels. Accordingly, in the vehicle the wheel cylinder diameter, etc. of which are equally designed between the front wheels and the rear wheels, ordinarily, in order for the front wheels to be precedingly locked, well known proportioning control valves are used to set the braking fluid pressure that is applied to the wheel cylinders of the rear wheels side to be lower than the braking fluid pressure that is applied to the wheel cylinders of the front wheels side. In this case, the way of the proportioning valves being connected is not the way of being reverse connected as in the case of the above-mentioned proportioning control valves 20 and 30 but the way of being normally connected so as to cause the braking fluid pressure from the master cylinder 11 to flow to the wheel cylinders while being attenuated. On the other hand, when applying the same braking fluid pressure to the wheel cylinders of the front and rear wheels, the wheel cylinder diameters, etc. of the rear wheels side are made smaller than those of the front wheels side. However, even if the proportioning control valves are used or the wheel cylinder diameters are changed in this way, it is not easy to make the braking force distribution ratio approximate to the ideal braking force distribution ratio. The reason for this is because, as the vehicle wheel braking force exhibited by the front wheels is increased the vehicle braking force for the rear wheels being locked is decreased, that is, this ideal braking force distribution ratio has a non-linear characteristic. Therefore, ordinarily, in view of this ideal braking force distribution ratio the vehicle wheel braking force of the rear wheels was set to be at a sufficiently small value. As a result, no effective use was made of the vehicle wheel braking force that can be exhibited by the rear wheels, with the result that adverse effect was caused such as the extension in the braking distance, what is worse, adverse effect was caused on even the motion of the vehicle body such as the pitching motion. Accordingly, in view of this, in order to cause an increase in the vehicle wheel braking force of the rear wheels side that is set and designed to be smaller by a predetermined magnitude than that which corresponds to the ideal braking force distribution, the vehicle wheel braking force of the rear wheels may be compensated for by pressure amplifying control. That is, the braking fluid pressure that corresponds to the predetermined magnitude by which the vehicle wheel braking force is designed to be smaller than that which corresponds to the ideal braking force distribution may be generated by pressure amplifying control and the generated braking fluid pressure may be added to the wheel cylinder of the rear wheels side. If the vehicle wheel braking force of the front wheels diverges from that which corresponds to the ideal braking force distribution, pressure amplifying control may be performed with respect to the wheel cylinder of the front wheels side to thereby make the vehicle wheel braking force of the front wheels side approximate to that which corresponds to the ideal braking force distribution ratio.

To what extent the vehicle wheel braking force of the front or rear wheels side has diverged from the ideal braking force distribution ratio can be estimated by the following method. For example, when the wheel cylinder diameters of the rear wheels side are designed to be smaller than those of the front wheels side and no pressure amplifying control is executed, if the same braking fluid pressure is applied to the front and rear wheel cylinders from the master cylinder. Accordingly, when the master cylinder pressure is the predetermined pressure KPM, to what extent the vehicle wheel braking force of the rear wheels side is diverging from that corresponding to the ideal braking force distribution (i.e., to what extent the braking fluid pressure with respect to the wheel cylinder of the rear wheels side is being short of from the pressure that corresponds to the ideal braking force distribution ratio) can be presumed by referring to the map of the ideal braking force distribution ratio that can be calculated beforehand from the vehicle data. Further, similarly, if the proportioning control valves are provided on the rear wheels side, also, when the master cylinder pressure is the predetermined pressure KPM, it can be determined to what extent the braking fluid pressure with respect to the rear wheel cylinder is decreased by the proportioning control valves from that which corresponds to the ideal braking force distribution ratio. Accordingly, the braking fluid pressure of to the rear wheel cylinder that is short of from that which corresponds to the ideal braking force distribution ratio is compensated for by pressure amplifying control. That is, a second braking fluid pressure that is higher than the master cylinder pressure is generated by pressure amplifying control, whereby this second pressure is added to the wheel cylinder of the rear wheels side. As a result, the vehicle wheel braking forces of the front wheels and the rear wheels can be adjusted so as to make the distribution ratio therebetween approximate to the ideal braking force distribution ratio. It is to be noted that the presumption on to what extent the rear wheel cylinder pressure has been increased by pressure amplifying control may be made based on the master cylinder pressure and pump drive time length or may be made using a wheel cylinder pressure sensor. Further, the presumption on to what extent the rear wheel cylinder pressure has been increased by pressure amplifying control can be made with a considerably high accuracy even if it is made based on only the pump drive time length alone. This is because the amount of movement of the braking fluid from the master cylinder side to the wheel cylinder side is substantially proportionate to the pump drive time length (the time length of the current being supplied to a motor for driving the pump) and, in correspondence with this amount of movement of the braking fluid, increase is also caused of the wheel cylinder pressure. Further, when applied in the diagonal piping illustrated in FIG. 1A, the braking fluid that has flown out from the wheel cylinders of the front wheels during anti-skid control is moved to the rear wheels side and, the pressure difference between the front and rear wheel sides is maintained by the proportioning control valve 20 (or proportioning valve 30), whereby the wheel cylinder pressure of the rear wheels side is increased up to the second braking fluid pressure and the braking force of the rear wheels side is thereby made approximate to the ideal vehicle wheel braking force distribution ratio.

Further, an electrically-controlled linear differential pressure adjusting valve can be adopted instead of the proportioning control valve 20, 30. This linear differential pressure adjusting valve is structured as a well-known two-position solenoid valve and can perform a gradual adjustment of brake fluid flowing amount in accordance with a lift length of a valve body controlled by, for example, duty ratio of driving signal provided to a solenoid disposed therein. That is to say, flowing amount of brake fluid from a wheel cylinder side to a master cylinder side can be controlled due to the lift length of the valve body and the lift length of the valve body corresponds to an average current of the duty driving signal. Therefore, because the linear differential pressure adjusting valve serves as a variable restrictor, retention coefficient of wheel cylinder pressure which is higher than master cylinder pressure can be arbitrarily varied. As a result, with the use of such a linear differential pressure adjusting valve, increasing gradient and amplifying ratio of wheel cylinder pressure up to pressure higher than the master cylinder pressure can be controlled in response to braking state of the vehicle or a vehicular motion.

What is claimed is:

1. An on-vehicle brake system comprising:

braking fluid pressure generating means for generating a first braking fluid pressure responsive to an operation of a brake pedal by a driver;

vehicle wheel braking force generating means for generating wheel braking force in rear wheels in response to said first braking fluid pressure; and control means for suppressing an occurrence of a pitching motion in a vehicle body by receiving said first braking fluid pressure and generating a second braking fluid pressure higher than said first braking fluid pressure, said second braking fluid pressure being applied to said vehicle wheel braking force generating means in place of said first braking fluid pressure from immediately before the vehicle is stopped until the vehicle is stopped.

2. An on-vehicle brake system according to claim 1, wherein a pressure increase gradient in said second braking fluid pressure is larger than that, which prevailed before the generation of said second braking fluid pressure, in said first braking fluid pressure.

3. An on-vehicle brake system comprising:

braking fluid pressure generating means for generating a first braking fluid pressure responsive to an operation of a brake pedal by a driver;

first vehicle wheel braking force generating means for generating vehicle wheel braking force in one of rear wheels in response to said first braking fluid pressure;

second vehicle wheel braking force generating means for generating vehicle wheel braking force in another of said rear wheels in response to said first braking fluid pressure; and control means for suppressing an occurrence of a pitching motion in a vehicle body by receiving said first braking fluid pressure and generating a second braking fluid pressure higher than said first braking fluid pressure, said second braking fluid pressure being applied to at least one of said first and second vehicle wheel braking force generating means in place of said first braking fluid pressure after the vehicle reaches a predetermined speed until the vehicle is stopped.

4. An on-vehicle brake system according to claim 3, further comprising:

third vehicle wheel braking force generating means for generating wheel braking force in one of front wheels in response to said first braking fluid pressure; and fourth vehicle wheel braking force generating means for generating wheel braking force in another of front wheels in response to said first braking fluid pressure;

wherein said control means has limiting means for limiting increase in said first braking fluid pressure to be applied to at least one of said third and fourth vehicle wheel braking force generating means.

5. An on-vehicle brake system according to claim 4, wherein a part of brake fluid to be supplied to at least one of said third and fourth vehicle wheel braking force generating means is moved to at least one of said first and second vehicle wheel braking force generating means in order to generate said second braking fluid pressure.

6. An on-vehicle brake system comprising:

first vehicle wheel braking force generating means for generating vehicle wheel braking force in one of rear wheels in response to given braking fluid pressure;

second vehicle wheel braking force generating means for generating vehicle wheel braking force in another of said rear wheels in response to given braking fluid pressure;

braking fluid pressure generating means for generating braking fluid pressure that is applied to said first and second vehicle wheel braking force generating means;

control means for suppressing an occurrence of a pitching motion in a vehicle body by, after said vehicle has been brought to a state of traveling at a speed lower than a predetermined speed, making braking fluid pressure that is applied to at least one of said first and second vehicle wheel braking force generating means to be higher than braking fluid pressure that was applied thereto before said vehicle reached said state of traveling at said speed lower than said predetermined speed;

third vehicle wheel braking force generating means for generating wheel braking force in one of front wheels;

fourth vehicle wheel braking force generating means for generating wheel braking force in another of said front wheels;

a first piping system for causing communication between said first and third vehicle wheel braking force generating means and said braking fluid pressure generating means; and a second piping system for causing communication between said second and fourth vehicle wheel braking force generating means and said braking fluid pressure generating means, wherein said control means increases braking fluid pressure that is applied to said first and second vehicle wheel braking force generating means for said rear wheels by moving braking fluid from said third and fourth vehicle wheel braking force generating means for said front wheels to said first and second vehicle wheel braking force generating means for rear wheels, and wherein said control means comprises:

limiting means which limits increase in braking fluid pressure which, during a time period of from a time that is immediately before said vehicle being stopped to a time of said vehicle being stopped, is applied to said third and fourth vehicle wheel braking force generating means for generating wheel braking force in said front wheels.

7. An on-vehicle brake system as set forth in claim 6, further comprising:

first pressure amplifying means which is disposed in said first piping system and amplifies braking fluid pressure applied to said first and third vehicle wheel braking force generating means so that braking fluid pressure applied to said first and third vehicle wheel braking force generating means is kept in a predetermined relationship with braking fluid pressure generated in said braking fluid pressure generating means;

second pressure amplifying means which is disposed in said second piping system and amplifies braking fluid pressure applied to said second and fourth vehicle wheel braking force generating means so that braking fluid pressure applied to said second and fourth vehicle wheel braking force generating means is kept in a predetermined relationship with braking fluid pressure generated in said braking fluid pressure generating means; and braking fluid pressure adjusting means which is respectively provided in said first and second piping systems and adjusts braking fluid pressure applied to each of said first to fourth vehicle wheel braking force generating means according to wheel motions of the respective vehicle wheels, wherein, after said vehicle has been brought to said state of traveling at said speed lower than said predetermined speed, said control means limits increase in braking fluid pressure applied to said third and fourth vehicle wheel braking force generating means by making said first and second pressure amplifying means operative in said first and second piping systems and executing an adjustment of braking fluid pressure by said braking fluid pressure adjusting means with respect to said third and fourth vehicle wheel braking force generating means.

8. An on-vehicle brake system as set forth in claim 7, wherein said first pressure amplifying means comprises:

first maintaining means which maintains a pressure difference between braking fluid pressure on a side of said first and third vehicle wheel braking force generating means and braking fluid pressure on a side of said braking fluid pressure generating means by allowing brake fluid to flow from said first and third vehicle wheel braking force generating means to said braking fluid pressure generating means while attenuating braking fluid pressure in response to braking fluid pressure on a side of said braking fluid pressure generating means; and first moving means which is connected in parallel with said first maintaining means and moves braking fluid from a braking fluid conduit between said braking fluid pressure generating means and said first maintaining means into a braking fluid conduit between said first maintaining means and said first and third vehicle wheel braking force generating means, and said second pressure amplifying means comprises:

second maintaining means which maintains a pressure difference between braking fluid pressure on a side of said second and fourth vehicle wheel braking force generating means and braking fluid pressure on a side of said braking fluid pressure generating means by allowing brake fluid to flow from said second and fourth vehicle wheel braking force generating means to said braking fluid pressure generating means while attenuating braking fluid pressure in response to braking fluid pressure on a side of said braking fluid pressure generating means; and second moving means which is connected in parallel with said second maintaining means and moves braking fluid from a braking fluid conduit between said braking fluid pressure generating means and said second maintaining means into a braking fluid conduit between said second maintaining means and said second and fourth vehicle wheel braking force generating means.

9. An on-vehicle brake system as set forth in claim 8, wherein said braking fluid pressure adjusting means comprises:

a reservoir for accumulating braking fluid in an amount that corresponds to a decrease in braking fluid pressure that is applied to each of said respective vehicle wheel braking force generating means, wherein said first and second moving means take in braking fluid which flows from each of the respective vehicle wheel braking force generating means into said reservoir due to an operation of said braking fluid pressure adjusting means and discharges brake fluid into a conduit on a respective vehicle wheel braking force generating means side of said first and second maintaining means.

10. An on-vehicle brake system as set forth in claim 7, wherein said braking fluid pressure adjusting means limits increase in braking fluid pressure that is applied to said vehicle wheel braking force generating means provided for at least one of said front wheels by maintaining or pressure-decreasing braking fluid pressure applied thereto.

11. An on-vehicle brake system as set forth in claim 7, wherein said braking fluid pressure adjusting means limits increase in braking fluid pressure that is applied to said vehicle wheel braking force generating means provided for at least one of said front wheels by executing pulse pressure increase control with respect to braking fluid pressure applied thereto.

12. An on-vehicle brake system comprising:

braking fluid pressure generating means for generating a first braking fluid pressure responsive to an operation of a brake pedal by a driver;

vehicle wheel braking force generating means for generating wheel braking force in rear wheels in response to said first braking fluid pressure; and control means for receiving said first braking fluid pressure and generating a second braking fluid pressure higher than said first braking fluid pressure, said second braking fluid pressure being applied to said vehicle wheel braking force generating means in place of said first braking fluid pressure upon detection of an occurrence of a pitching motion of a vehicle body.

13. An on-vehicle brake system as set forth in claim 12, wherein said control means detects said occurrence of said pitching motion based on a vehicle body speed and, when said vehicle body speed becomes lower than a predetermined value, applies said second braking fluid pressure to said vehicle wheel braking force generating means provided for said rear wheels.

14. An on-vehicle brake system as set forth in claim 12, wherein said control means detects said occurrence of said pitching motion based on an operating speed of a brake pedal that is operated by a driver and, when said operating speed of said brake pedal exceeds a predetermined value, determines that said pitching motion occurs in the vehicle body and thereby applies said second braking fluid pressure to said vehicle wheel braking force generating means provided for said rear wheels.

15. An on-vehicle brake system as set forth in claim 12, wherein said control means detects said occurrence of said pitching motion based on a master cylinder pressure that is generated in correspondence with an operation of a brake pedal performed by a driver and, when a level of said master cylinder pressure is higher than a predetermined value, determines that said pitching motion occurs in said vehicle body and thereby applies said second braking fluid pressure to said vehicle wheel braking force generating means for said rear wheels.

16. An on-vehicle brake system comprising:

braking fluid pressure generating means for generating a first braking fluid pressure responsive to an operation of a brake pedal by a driver;

vehicle wheel braking force generating means for generating wheel braking force in rear wheels in response to said first braking fluid pressure;

anti-skid control means for adjusting said first braking fluid pressure to be applied to said vehicle wheel braking force generating means so as to ensure an optimum slippage of wheels; and control means for suppressing an occurrence of a pitching motion in a vehicle body by receiving said first braking fluid pressure and generating a second braking fluid pressure higher than said first braking fluid pressure, said second braking fluid pressure being applied to at least said vehicle wheel braking force generating means provided for rear wheels in place of said first braking fluid pressure upon detection of an occurrence of a pitching motion in a vehicle body, wherein said control means changes its control contents depending on a state of execution of said anti-skid control means.

17. An on-vehicle brake system comprising:

braking fluid pressure generating means that includes a braking fluid pressure generating source that generates a first braking fluid pressure at a time of a vehicle being braked;

first vehicle wheel braking force generating means for generating vehicle wheel braking force in a rear left wheel in correspondence with said first braking fluid pressure;

second vehicle wheel braking force generating means for generating vehicle wheel braking force in a rear right wheel in correspondence with said first braking fluid pressure;

third vehicle wheel braking force generating means for generating vehicle wheel braking force in a front left wheel in correspondence with said first braking fluid pressure;

fourth vehicle wheel braking force generating means for generating vehicle wheel braking force in a front right wheel in correspondence with said first braking fluid pressure;

a first braking piping system for causing communication between said braking fluid pressure generating means and said first and second vehicle wheel braking force generating means;

a second braking piping system for causing communication between said braking fluid pressure generating means and said third and fourth vehicle wheel braking force generating means;

adjusting means for independently adjusting braking fluid pressure that is applied to said first to fourth vehicle wheel braking force generating means;

pressure amplifying means which is provided on said first braking piping system and generates a second braking fluid pressure that is higher than said first braking fluid pressure generated by said braking fluid pressure generating means; and control means for, during a time period of from a time that is immediately before a vehicle being stopped to a time of the vehicle being stopped, causing said pressure amplifying means to be operative and said second braking fluid pressure to be applied in a place of said first braking fluid pressure, wherein said pressure amplifying means comprises:

first maintaining means which maintains a pressure difference between braking fluid pressure on a side of said first and second vehicle wheel braking force generating means and braking fluid pressure on a side of said braking fluid pressure generating means by allowing brake fluid to flow from said first and second vehicle wheel braking force generating means to said braking fluid pressure generating means while attenuating braking fluid pressure in response to braking fluid pressure on a side of said braking fluid pressure generating means; and first moving means which is connected in parallel with said first maintaining means and moves braking fluid from a braking fluid conduit between said braking fluid pressure generating means and said first maintaining means into a braking fluid conduit between said first maintaining means and said first and second vehicle wheel braking force generating means.

18. An on-vehicle brake system comprising:

first and second vehicle wheel braking force generating means for generating vehicle wheel braking force in front wheels;

third and fourth vehicle wheel braking force generating means for generating vehicle wheel braking force in rear wheels;

braking fluid pressure generating means for generating a first braking fluid pressure by an operation performed by a driver in order to supply said first braking fluid pressure to said first to fourth vehicle wheel braking force generating means;

determining means for determining whether or not a distribution ratio between braking fluid pressure applied to said first and second vehicle wheel braking force generating means and braking fluid pressure applied to said third and fourth braking force generating means has diverged by a predetermined value or more from an ideal braking force distribution ratio between said front and rear wheels; and control means for, when said determining means determines that said distribution ratio had diverged by said predetermined value or more from said ideal braking force distribution ratio, in a conduit which runs between said braking fluid pressure generating means and said third and fourth vehicle wheel braking force generating means, decreases braking fluid of a predetermined amount from a first conduit portion on a side of said braking fluid pressure generating means, said first conduit portion being applied with said first braking fluid pressure, moves said braking fluid of said predetermined amount decreased from said first conduit portion to a second conduit portion on a side of said third and fourth vehicle wheel braking force generating means, and maintains a pressure difference between a braking fluid pressure generating means side and a third and fourth vehicle wheel braking force generating means side to thereby apply a second braking fluid pressure in place of said first braking fluid pressure to said third and fourth vehicle wheel braking force generating means, said second braking fluid pressure being higher than said first braking fluid pressure.

19. The on-vehicle brake system according to claim 18, wherein said pressure difference between said braking fluid pressure generating means side and said third and fourth vehicle wheel braking force generating means side is maintained by a proportioning control valve being reverse connected.

20. The on-vehicle brake system according to claim 18, wherein said determining means determines based on a vehicle body deceleration to what extent said distribution ratio between braking fluid pressure applied to said first and second vehicle wheel braking force generating means and braking fluid pressure applied to said third and fourth braking force generating means has diverged.

21. The on-vehicle brake system according to claim 18, wherein said determining means determines based on a stroke of a brake pedal depressed by a driver to what extent said distribution ratio between braking fluid pressure applied to said first and second vehicle wheel braking force generating means and braking fluid pressure applied to said third and fourth braking force generating means has diverged.

22. The on-vehicle brake system according to claim 18, wherein said determining means determines based on a level of said first braking fluid pressure generated by a braking operation performed by a driver to what extent said distribution ratio between braking fluid pressure applied to said first and second vehicle wheel braking force generating means and braking fluid pressure applied to said third and fourth braking force generating means has diverged.

* * * * *